United States Patent
Liu et al.

(10) Patent No.: US 11,456,896 B2
(45) Date of Patent: Sep. 27, 2022

(54) RRC CONFIGURATION FOR APERIODIC SRS ON ADDITIONAL SRS SYMBOLS

(71) Applicant: QUALCOMM Incorporated, San Diego, CA (US)

(72) Inventors: Le Liu, Fremont, CA (US); Alberto Rico Alvarino, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 194 days.

(21) Appl. No.: 16/704,966

(22) Filed: Dec. 5, 2019

(65) Prior Publication Data

US 2020/0204407 A1 Jun. 25, 2020

Related U.S. Application Data

(60) Provisional application No. 62/783,027, filed on Dec. 20, 2018.

(51) Int. Cl.
 *H04L 5/00* (2006.01)
 *H04L 25/02* (2006.01)
 (Continued)

(52) U.S. Cl.
 CPC ....... *H04L 25/0226* (2013.01); *H04B 1/7143* (2013.01); *H04L 5/0051* (2013.01);
 (Continued)

(58) Field of Classification Search
 None
 See application file for complete search history.

(56) References Cited

U.S. PATENT DOCUMENTS

| 9,270,435 | B2 * | 2/2016 | Lindholm | H04L 5/005 |
| 2012/0281604 | A1 * | 11/2012 | Papasakellariou | H04L 27/2613 370/310 |

(Continued)

OTHER PUBLICATIONS

Huawei, et al., "Remaining Details of SRS Antenna Switching", 3GPP Draft, 3GPP TSG RAN WG1 Meeting #91, R1-1719821, 3rd Generation Partnership Project (3GPP), Mobile Competence Centre, 650, Route Des Lucioles, F-06921, Sophia-Antipolis Cedex, France, vol. RAN WG1, No. Reno, USA; Nov. 27, 2017-Dec. 1, 2017, Nov. 17, 2017 (Nov. 17, 2017), XP051369198, 4 pages, Retrieved from the Internet: URL: http://www.3gpp.org/ftp/tsg%5Fran/WG1%5FRL1/TSGR1%5F91/Docs/ [retrieved on Nov. 17, 2017] Section 2.1, 2.2.

(Continued)

*Primary Examiner* — Duc T Duong
(74) *Attorney, Agent, or Firm* — Patterson+ Sheridan, L.L.P.

(57) ABSTRACT

Certain aspects of the present disclosure provide techniques for radio resource control (RRC) configuration for sounding reference signal (SRS) on additional SRS symbols in an uplink subframe. An example method performed by user equipment generally includes receiving, from the network, signaling indicating, for a set of uplink subframes, a first configuration for transmitting one or more SRS transmissions of a first type and a second configuration for transmitting one or more SRS transmission of a second type; and transmitting, within at least one uplink subframe of the set of uplink subframes, at least one of the one or more SRS transmissions of the first type or the one or more SRS transmissions of the second type based, at least in part, on at least one of the first configuration or the second configuration.

51 Claims, 9 Drawing Sheets

(51) Int. Cl.
*H04W 72/04* (2009.01)
*H04B 1/7143* (2011.01)
*H04L 27/26* (2006.01)

(52) U.S. Cl.
CPC ..... *H04L 27/2607* (2013.01); *H04W 72/0446* (2013.01); *H04W 72/0453* (2013.01)

(56) References Cited

U.S. PATENT DOCUMENTS

| | | | | |
|---|---|---|---|---|
| 2013/0078913 | A1* | 3/2013 | Lee | H04W 52/146 455/39 |
| 2013/0201941 | A1* | 8/2013 | Glasson | H04W 72/1278 370/329 |
| 2016/0192356 | A1* | 6/2016 | Lee | H04W 52/325 370/280 |
| 2017/0013565 | A1* | 1/2017 | Pelletier | H04W 52/367 |
| 2017/0048717 | A1* | 2/2017 | Yoo | H04L 5/1469 |
| 2017/0170940 | A1* | 6/2017 | Lee | H04L 5/1469 |
| 2017/0195028 | A1* | 7/2017 | Shimezawa | H04W 28/06 |
| 2017/0223675 | A1* | 8/2017 | Dinan | H04W 72/042 |
| 2019/0098654 | A1 | 3/2019 | Li et al. | |
| 2019/0215110 | A1* | 7/2019 | Yang | H04W 74/0816 |
| 2019/0230707 | A1* | 7/2019 | Bergljung | H04W 72/042 |
| 2019/0260612 | A1* | 8/2019 | He | H04W 72/04 |
| 2019/0320453 | A1* | 10/2019 | Hosseini | H04L 25/0202 |
| 2020/0162214 | A1* | 5/2020 | Tang | H04W 72/1268 |
| 2020/0204313 | A1* | 6/2020 | Choi | H04W 72/042 |
| 2021/0076236 | A1* | 3/2021 | Kimura | H04W 24/10 |
| 2021/0250149 | A1* | 8/2021 | Muruganathan | H04L 5/0048 |

OTHER PUBLICATIONS

Huawei, et al., "UL SRS Design for Beam Management and CSI Acquisition", 3GPP Draft, 3GPP TSG RAN WG1 Meeting #90, R1-1712238, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 21, 2017-Aug. 25, 2017, Aug. 20, 2017 (Aug. 20, 2017), XP051315055, 12 Pages, Retrieved from the Internet: URL: http://www.3gpp.org/ftp/Meetings_3GPP_SYNC/RAN1/Docs/, [retrieved on Aug. 20, 2017], figures 6, 7, Sections 1, 2.1.2, 2.2.2, 2.2.3, 2.3, 2.5.
International Search Report and Written Opinion—PCT/US2019/064913—ISA/EPO—dated Jun. 5, 2020.
"3rd Generation Partnership Project: Technical Specification Group Radio Access Network, Evolved Universal Terrestrial Radio Access (E-UTRA), Physical channels and modulation (Release 15)", 3GPP Standard, Technical Specification, 3GPP TS 36.211, 3rd Generation Partnership Project (3GPP), Mobile Competence Centre, 650, Route Des Lucioles, F-06921, Sophia-Antipolis Cedex, France, vol. RAN WG1, No. V15.3.0, Sep. 27, 2018 (Sep. 27, 2018), pp. 9-93, XP051487403, [retrieved on Sep. 27, 2018], the whole document.
ERICSSON: "On Rel-16 LTE SRS Enhancements", 3GPP Draft, R1-1813274, On Multi-Symbol SRS Enhancements, 3rd Generation Partnership Project (3GPP), Mobile Competence Centre, 650, Route Des Lucioles, F-06921, Sophia-Antipolis Cedex, France, vol. RAN WG1, No. Spokane, US, Nov. 12, 2018-Nov. 16, 2018, Nov. 11, 2018 (Nov. 11, 2018), XP051555290, 94 pages, Retrieved from the Internet: URL: http://www.3gpp.org/ftp/Meetings%5F3GPP%5FSYNC/RAN1/Docs/R1%2D1813274%2Ezip. [retrieved on Nov. 11, 2018], Section 2.2.
LG Electronics: "Enhancements on SRS Resource Allocation", 3GPP Draft, R1-1812541, Enhancements on SRS Resource Allocation, 3rd Generation Partnership Project (3GPP), Mobile Competence Centre, 650, Route Des Lucioles, F-06921, Sophia-Antipolis Cedex, France, vol. RAN WG1, No. Spokane, Nov. 12, 2018-Nov. 16, 2018, Nov. 11, 2018 (Nov. 11, 2018), XP051554485, 4 pages, Retrieved from the Internet: URL: http://www.3gpp.org/ftp/Meetings%5F3GPP%5FSYNC/RAN1/Docs/R1%2D1812541%2Ezip. [retrieved on Nov. 11, 2018], Sections 2.1-2.2.
Partial International Search Report—PCT/US2019/064913—ISA/EPO—dated Mar. 20, 2020.
Qualcomm Incorporated: "Additional SRS Symbols", 3GPP Draft, R1-1813052, SRS Additional Symbols, 3rd Generation Partnership Project (3GPP), Mobile Competence Centre, 650, Route Des Lucioles, F-06921, Sophia-Antipolis Cedex, France, vol. RAN WG1, No. Spokane, USA, Nov. 12, 2018-Nov. 16, 2018, Nov. 11, 2018 (Nov. 11, 2018), XP05 1555033, 9 pages, Retrieved from the Internet: URL: http://www.3gpp.org/ftp/Meetings%5F3GPP%5FSYNC/RAN1/Docs/R1%2D1813052%2Ezip. [retrieved on Nov. 11, 2018], Sections 2.1-2.3 and 4.

* cited by examiner

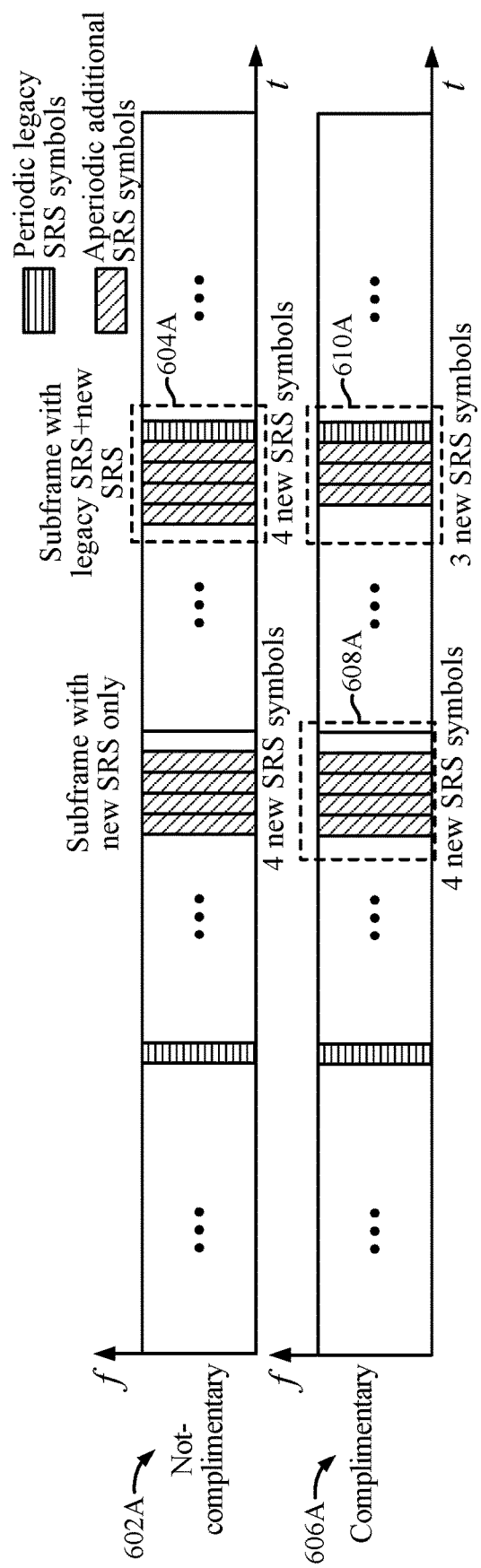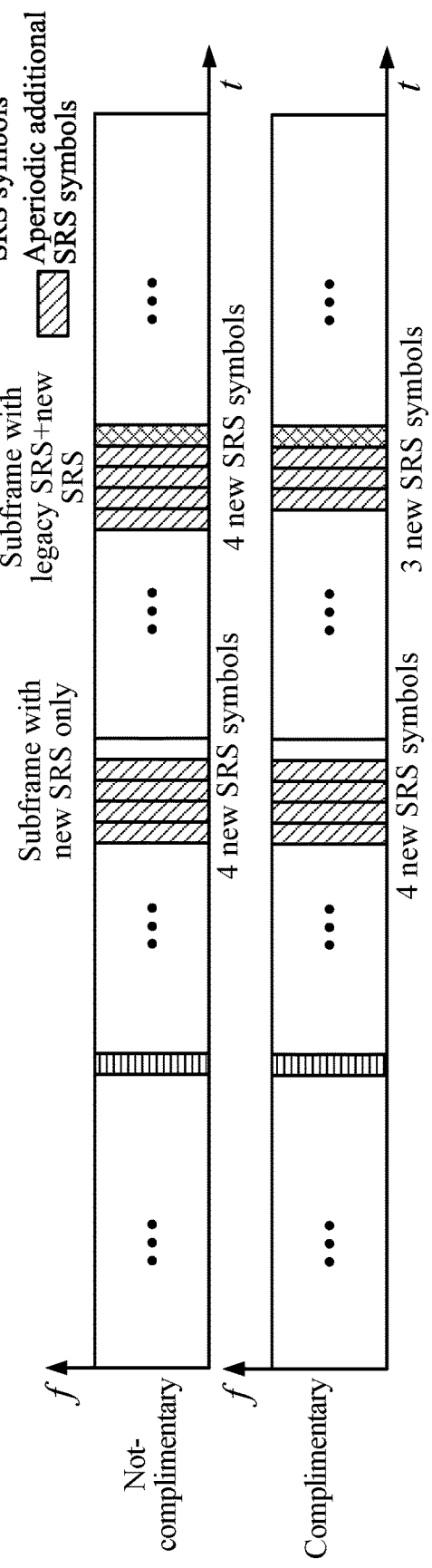
FIG. 6A
FIG. 6B

RRC CONFIGURATION FOR APERIODIC SRS ON ADDITIONAL SRS SYMBOLS

CLAIM OF PRIORITY UNDER 35 U.S.C. § 119

This application claims benefit of U.S. Provisional Patent Application Ser. No. 62/783,027, filed Dec. 20, 2018, which is herein incorporated by reference in its entirety.

FIELD OF THE DISCLOSURE

Aspects of the present disclosure relate to wireless communications, and more particularly, to techniques for radio resource control (RRC) configuration for sounding reference signal (SRS) on additional SRS symbols in an uplink subframe.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a base station (BS). The method generally includes transmitting, to a user equipment (UE), signaling indicating, for a set of uplink subframes, a first configuration for transmitting one or more SRS transmissions of a first type and a second configuration for transmitting one or more SRS transmission of a second type and receiving, within at least one uplink subframe of the set of uplink subframes, at least one of the one or more SRS transmissions of the first type or the one or more SRS transmissions of the second type based, at least in part, on at least one of the first configuration or the second configuration.

Certain aspects provide an apparatus for wireless communications by a base station (BS). The apparatus generally includes at least one processor configured to transmit, to a user equipment (UE), signaling indicating, for a set of uplink subframes, a first configuration for transmitting one or more SRS transmissions of a first type and a second configuration for transmitting one or more SRS transmission of a second type and receive, within at least one uplink subframe of the set of uplink subframes, at least one of the one or more SRS transmissions of the first type or the one or more SRS transmissions of the second type based, at least in part, on at least one of the first configuration or the second configuration. The apparatus also generally includes a memory coupled with the at least one processor.

Certain aspects provide an apparatus for wireless communications by a base station (BS). The apparatus generally includes means for transmitting, to a user equipment (UE), signaling indicating, for a set of uplink subframes, a first configuration for transmitting one or more SRS transmissions of a first type and a second configuration for transmitting one or more SRS transmission of a second type and means for receiving, within at least one uplink subframe of the set of uplink subframes, at least one of the one or more SRS transmissions of the first type or the one or more SRS transmissions of the second type based, at least in part, on at least one of the first configuration or the second configuration.

Certain aspects provide a non-transitory computer-readable medium for wireless communications by a base station (BS). The non-transitory computer-readable medium generally includes instructions that, when executed by at least one processor, configure the at least one processor to transmit, to a user equipment (UE), signaling indicating, for a set of uplink subframes, a first configuration for transmitting one or more SRS transmissions of a first type and a second configuration for transmitting one or more SRS transmission of a second type and receive, within at least one uplink subframe of the set of uplink subframes, at least one of the one or more SRS transmissions of the first type or the one or more SRS transmissions of the second type based, at least in part, on at least one of the first configuration or the second configuration.

Certain aspects provide a method for wireless communications by a user equipment in a network. The method generally includes receiving, from the network, signaling indicating, for a set of uplink subframes, a first configuration for transmitting one or more SRS transmissions of a first type and a second configuration for transmitting one or more SRS transmission of a second type and transmitting, within at least one uplink subframe of the set of uplink subframes, at least one of the one or more SRS transmissions of the first type or the one or more SRS transmissions of the second type based, at least in part, on at least one of the first configuration or the second configuration.

Certain aspects provide an apparatus for wireless communications by a user equipment in a network. The apparatus generally includes at least one processor configured to receive, from the network, signaling indicating, for a set of uplink subframes, a first configuration for transmitting one or more SRS transmissions of a first type and a second configuration for transmitting one or more SRS transmission of a second type and transmit, within at least one uplink subframe of the set of uplink subframes, at least one of the one or more SRS transmissions of the first type or the one or more SRS transmissions of the second type based, at least in part, on at least one of the first configuration or the second configuration. The apparatus also generally includes a memory coupled with the at least one processor.

Certain aspects provide an apparatus for wireless communications by a user equipment in a network. The apparatus generally includes means for receiving, from the network, signaling indicating, for a set of uplink subframes, a first configuration for transmitting one or more SRS transmissions of a first type and a second configuration for transmitting one or more SRS transmission of a second type and means for transmitting, within at least one uplink subframe of the set of uplink subframes, at least one of the one or more SRS transmissions of the first type or the one or more SRS transmissions of the second type based, at least in part, on at least one of the first configuration or the second configuration.

Certain aspects provide a non-transitory computer-readable medium for wireless communications by a user equipment in a network. The non-transitory computer-readable medium generally includes instructions that, when executed by at least one processor, configure the at least one processor to receive, from the network, signaling indicating, for a set of uplink subframes, a first configuration for transmitting one or more SRS transmissions of a first type and a second configuration for transmitting one or more SRS transmission of a second type and transmit, within at least one uplink subframe of the set of uplink subframes, at least one of the one or more SRS transmissions of the first type or the one or more SRS transmissions of the second type based, at least in part, on at least one of the first configuration or the second configuration.

Certain aspects of the present disclosure also provide various apparatus, means, and computer readable medium configured to perform (or cause a processor to perform) the operations described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIGS. 6A-6D illustrate different examples of complementary SRS transmissions in symbols of subframes, in accordance with aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for radio resource control (RRC) configuration for aperiodic sounding reference signal (A-SRS) on additional SRS symbols.

The following description provides examples of RRC configuration for A-SRS on additional SRS symbols, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
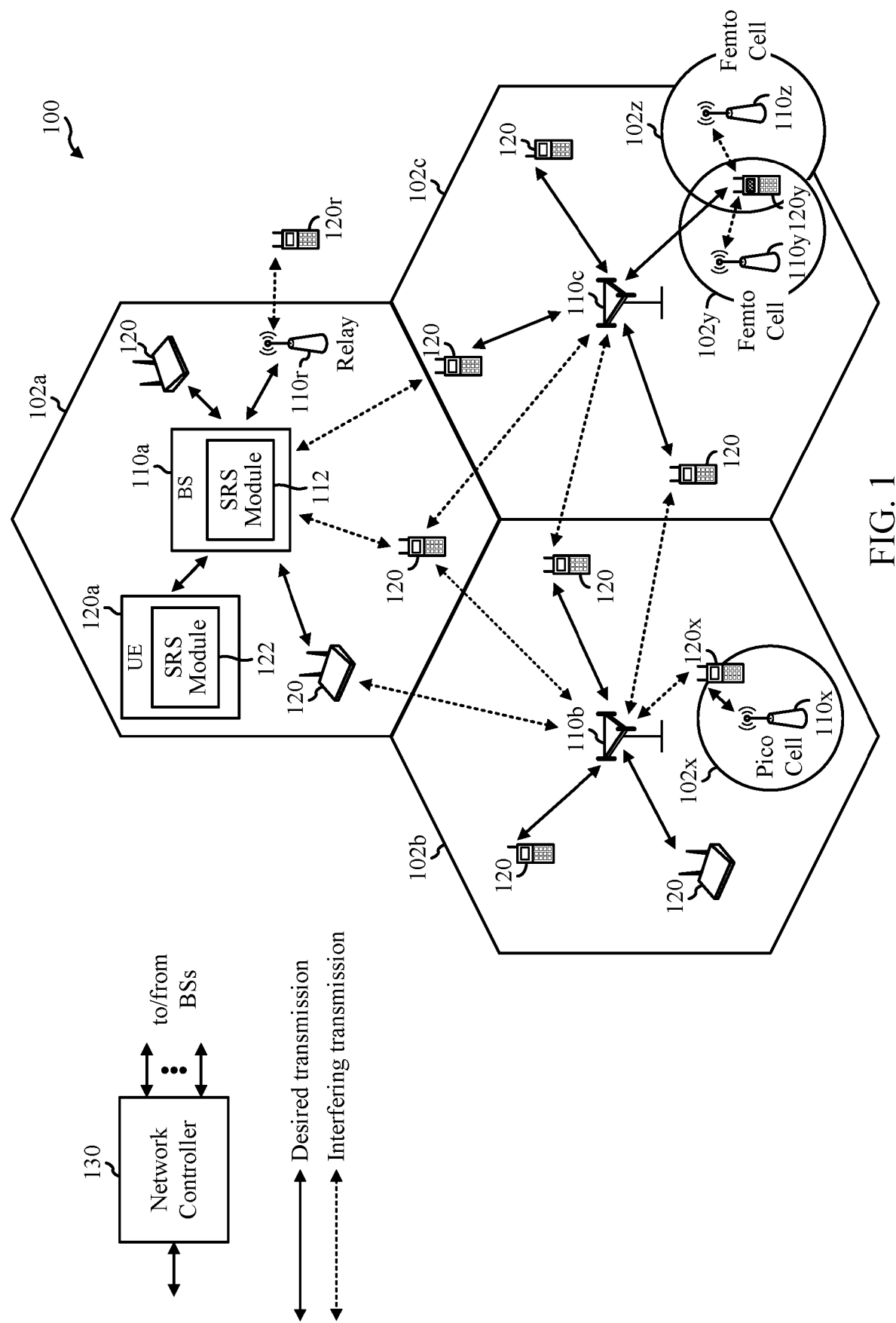
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for aperiodic SRS transmission on additional SRS symbol as described herein. As shown in FIG. 1, the BS 110a includes a sounding reference signal (SRS) module 112. The SRS module 112 may be configured to perform the operations illustrated in one or more of FIGS. 3 and 5-6, as well as other operations disclosed herein for configuring aperiodic SRS transmission on additional SRS symbols, in accordance with aspects of the present disclosure. Additionally, as shown in FIG. 1, the UE 120a includes a SRS module 122. The SRS module 122 may be configured to perform the operations illustrated in one or more of FIGS. 4-6, as well as other operations disclosed herein for configuring aperiodic SRS on additional SRS symbols, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
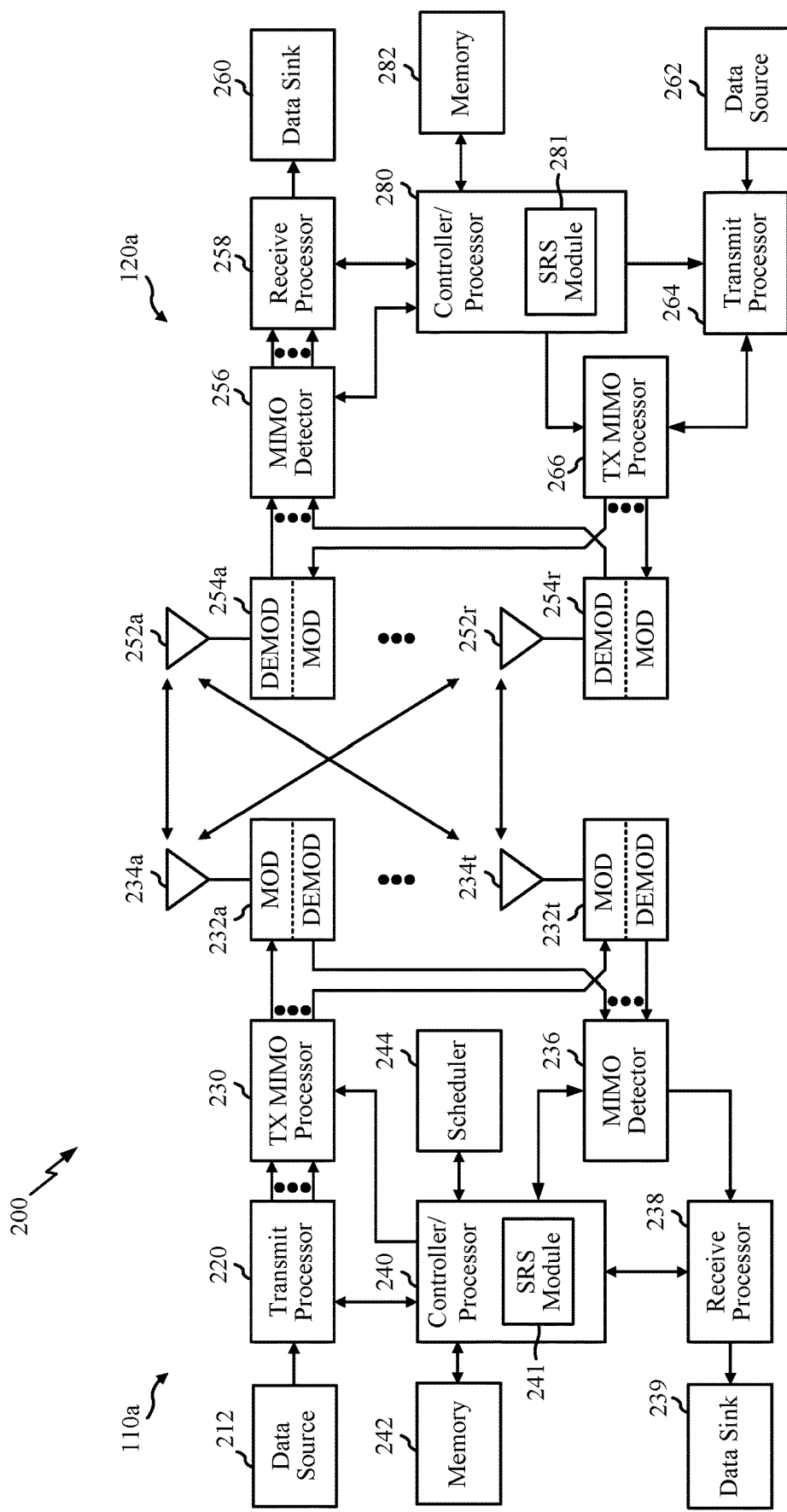
FIG. 2 is a block diagram conceptually illustrating a design of an example base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 240 of the BS 110a includes an SRS module 241 that may be configured to perform the operations illustrated in one or more of FIGS. 3 and 5-6, as well as other operations disclosed herein for aperiodic SRS transmission on additional SRS symbols, according to aspects described herein. As shown in FIG. 2, the controller/processor 280 of the UE 120a includes SRS module 281 that may be configured to perform the operations illustrated in one or more of FIGS. 4-6, as well as other operations disclosed herein for aperiodic SRS transmission on additional SRS symbols, according to aspects described herein. Although shown at the Controller/Processor, other components of the UE 120a and BS 110a may be used performing the operations described herein.

Example A—SRS Transmission and Rate Matching

In wireless communication systems, such as the wireless communication system described above, user equipments (UEs) may transmit sounding reference signals (SRSs) so that the network/base station (e.g., eNBs, gNB, etc.) can measure uplink channel quality. Conventionally, one SRS is transmitted by the UE in a last symbol of a normal uplink subframe. However, more recently, additional symbols have been introduced for transmitting SRSs in a normal uplink (UL) subframe. These additional SRS symbols which may be identified based on a flexible SRS symbol location configuration and/or a virtual cell ID associated with the UE that transmitted the (additional) SRSs. In this context, a "normal subframe" is contrasted with a "special subframe" such as those defined as a mixed DL/UL subframe with the three fields including a downlink pilot time slot (DwPTS) field, guard period (GP) field, and an uplink pilot time slot (UpPTS) field. Further, "special subframes" may be placed between "normal DL subframes" and "normal UL subframes" and allow a UE to switch between receive and transmit processing in TDD system.

In some cases, SRS capacity and coverage enhancements may be supported by introducing more than one symbol for SRS on UL normal subframe. This may involve introducing more than one symbol for SRS for one UE or for multiple UEs in a UL normal subframe. As a baseline, a minimum SRS resource allocation granularity for a cell may be one slot (e.g., one of two time slots of a subframe) or a subframe, when more than one symbol in a normal subframe is allocated for SRS for the cell. As noted above, a virtual cell ID may be introduced for SRS, allowing different SRS transmissions to be distinguished.

Additionally, in some cases, intra-subframe frequency hopping and repetition may be supported for aperiodic SRS in the additional SRS symbols of a normal uplink subframe. Intra-subframe frequency hopping for aperiodic SRS transmission may involve transmitting aperiodic SRSs on different frequency bands on a symbol-by-symbol basis in a subframe. Additionally, aperiodic SRS repetition may involve repeating transmission of an aperiodic SRS. For example, aperiodic SRS transmission may involve repeating transmission of an aperiodic SRS transmitted in a first additional symbol of a subframe (e.g., using a first antenna, frequency band, etc.) in a second additional symbol of the subframe.

Further, intra-subframe antenna switching may be supported for aperiodic SRS in the additional SRS symbols. Intra-subframe antenna switching for aperiodic SRS transmission may involve transmitting aperiodic SRSs using different antennas on a symbol-by-symbol basis in a subframe.

Both legacy SRS and additional SRS symbol(s) may be configured for the same UE. In some cases, the legacy SRS may be a periodic SRS (P-SRS) or an aperiodic SRS (A-SRS) transmitted in last symbol of a normal uplink subframe. The additional SRS symbols may be the non-legacy SRS symbols in a normal uplink subframe. In another case, the additional SRS symbols may be configured in all symbols, including last symbol, of a normal uplink subframe. Additionally, in some cases, the additional SRS may be aperiodically triggered. In some cases, a UE may be allowed to transmit periodic legacy SRS and aperiodic additional SRS in the same normal uplink subframe. In the case of aperiodic legacy SRS, a UE may transmit only one of legacy SRS or additional SRS symbol(s) in a normal uplink subframe. Thus, aspects of the present disclosure provide techniques for improving the transmission of only one of legacy SRS or additional SRS symbol(s) in a same normal uplink subframe as well as techniques for the transmission of both legacy SRS and additional SRS symbols in a same normal uplink subframe.

Figure 3:
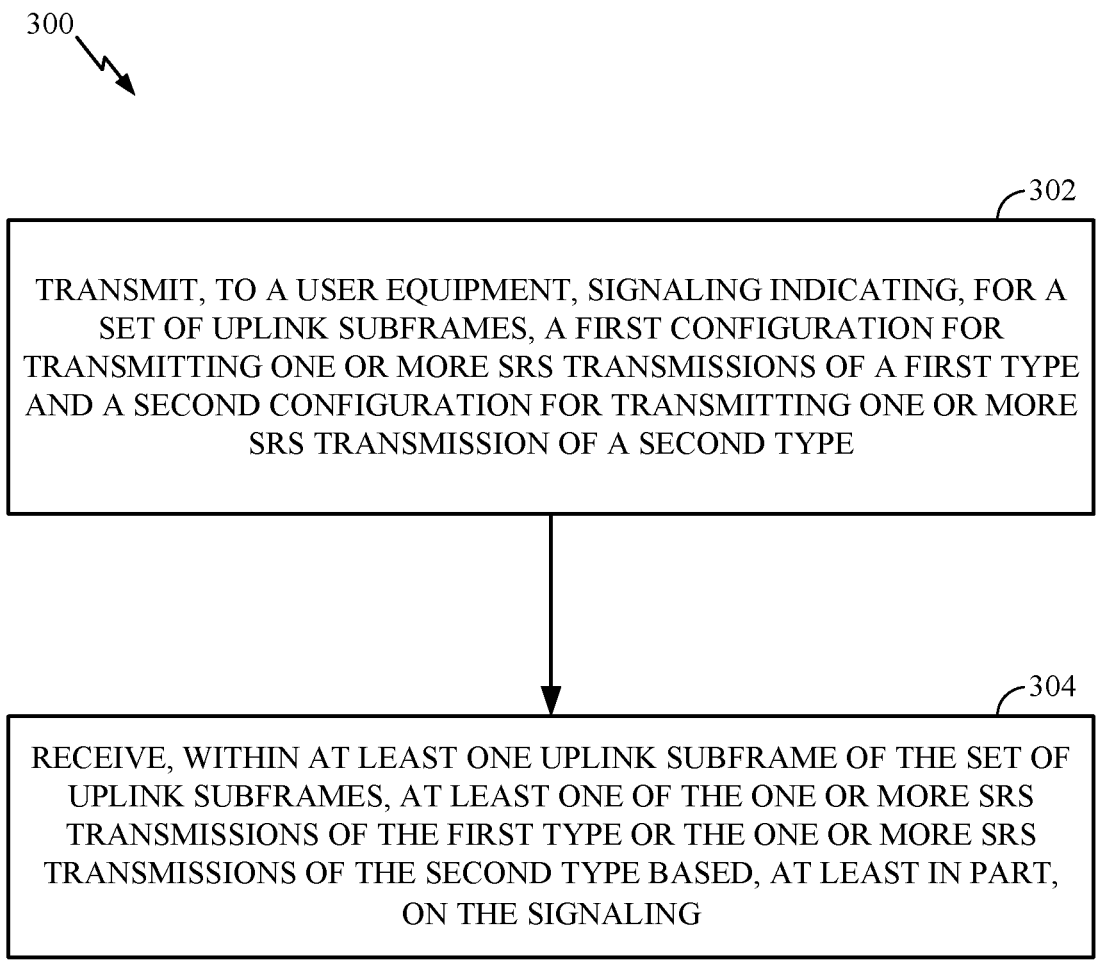
FIG. 3 illustrates example operations for wireless communications by a network entity, in accordance with certain aspects of the present disclosure.

FIG. 3 illustrates example operations 300 for wireless communications by a network entity. In some cases, the network entity may include a base station (e.g., gNB) configured to configure a UE for A-SRS transmission in accordance with aspects of the present disclosure.

According to aspects, the base station may include one or more components as illustrated in FIG. 2, which may be configured to perform the operations described herein. For example, the antenna 234, transceivers 232, controller/processor 240, and/or memory 242 as illustrated in FIG. 2 may perform the operations described herein.

Operations 300 begin, at 302, by transmitting, to a user equipment, signaling indicating, for a set of uplink subframes, a first configuration for transmitting one or more SRS transmissions of a first type and a second configuration for transmitting one or more SRS transmission of a second type.

At 304, the network entity receives, within at least one uplink subframe of the set of uplink subframes, at least one of the one or more SRS transmissions of the first type or the one or more SRS transmissions of the second type based, at least in part, on the signaling.

Figure 4:
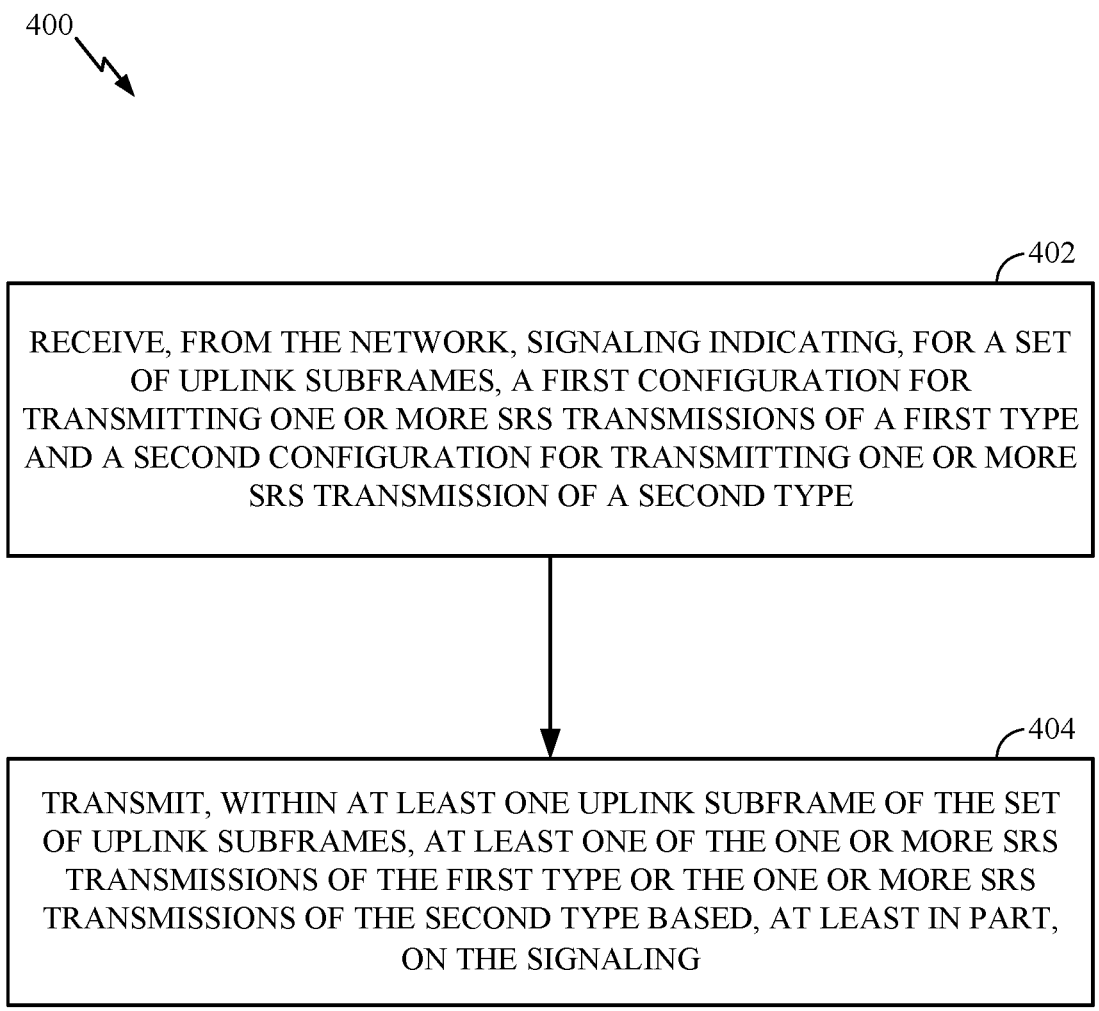
FIG. 4 illustrates example operations for wireless communications by a user equipment, in accordance with certain aspects of the present disclosure.

FIG. 4 illustrates example operations 400 for wireless communications by a network entity in a network. For example, operations 400 may be performed by a UE for configuration and transmission of A-SRS in accordance with aspects of the present disclosure.

According to aspects, the UE may include one or more components as illustrated in FIG. 2 which may be configured to perform the operations described herein. For example, the antenna 252, transceivers 254, controller/processor 280, and/or memory 282 as illustrated in FIG. 2 may perform the operations described herein.

Operations 400 begin, at 402, by receiving, from the network, signaling indicating, for a set of uplink subframes, a first configuration for transmitting one or more SRS transmissions of a first type and a second configuration for transmitting one or more SRS transmission of a second type.

At 404, the UE transmits, within at least one uplink subframe of the set of uplink subframes, at least one of the one or more SRS transmissions of the first type or the one or more SRS transmissions of the second type based, at least in part, on the signaling.

As noted above, aspects of the present disclosure provide techniques for configuring UEs to transmit SRSs in an uplink subframe. For example, aspects of the present disclosure provide techniques for configuring a non-legacy UE to be able to transmit both SRSs of a first type and SRSs of a second type in a same or different uplink subframe, while also remaining backwards compatible to legacy UEs that are only capable of transmitting SRSs of a second type in an uplink subframe. According to aspects, SRSs of the first type may include non-legacy SRSs while SRSs of the second type may include legacy SRSs. In this context, legacy SRSs may refer to SRS transmitted in a last symbol of a normal UL subframe while non-legacy SRSs may refer to additional SRSs transmitted in symbols of the subframe other than the last symbol of the subframe.

According to aspects, a resource configuration for the SRS transmissions of the first type may be different from that of the SRS transmissions of the second type in at least one uplink subframe. For example, in some cases, the SRSs of the first type, also known as "additional SRSs" (e.g., SRSs added to a subframe in addition to the legacy SRSs) may include SRS transmissions not located in a last symbol of an uplink, while SRSs of the second type may include SRS transmissions located in at least one of the last symbol. Additionally, in some cases, the SRS transmissions of the first type may be triggered in same or different way from that of the SRS transmissions of the second type, as explained below.

According to aspects, the SRS transmissions of the first type may include at least one of one of periodic SRS transmissions or aperiodic SRS transmissions. Additionally, the SRS transmissions of the second type may also include at least one of periodic SRS transmissions or aperiodic SRS transmissions.

As noted above, the base station may transmit signaling to the UE, indicating a first configuration for transmitting one or more SRS transmissions of the first type and a second configuration for transmitting one or more SRS transmission of the second type. In some cases, the first configuration and/or the second configuration may be transmitted/received in at least one of a radio resource control (RRC) message or downlink control information (DCI).

For example, in some cases, the first configuration for transmitting the one or more SRS transmissions of the first type may include a subframe configuration for transmitting, for example, aperiodic SRSs, and may be configured by indicating the higher-layer parameter srs-ConfigIndexAP. According to aspects, the first configuration may include a periodicity and a subframe offset for transmitting the one or more SRS transmissions of the first type, which may be the same or different from that of the SRS transmissions of the second type. For example, the UE may receive the first configuration and determine which subframes and the periodicity for transmitting the SRSs of the first type based on the subframe offset information and the periodicity information. If no explicit indication of srs-ConfigIndexAP for the SRS transmission of the first type, the UE may use the same srs-ConfigIndexAP of the SRS transmission of the second type for the SRS transmission of the first type by default.

In some cases, the subframes in which SRSs of the first type are configured to be transmitted may be the same or different as the subframes in which SRSs of the second type are configured to be transmitted. For example, in some cases, the base station may configure the SRS transmissions of the first type in a different normal uplink subframe than SRS transmissions of the second type. Thus, in this case, the SRS transmissions of the first type and the SRS transmissions of the second type may not overlap in a same subframe. Additionally, in this case, SRS resources for the SRS transmissions of the first type may thus include a last symbol of a normal uplink subframe. For example, when the UE receives signaling with a configuration indicating that SRS transmissions of the first type do not overlap with SRS transmissions of the second type in a same normal uplink subframe, the UE may transmit SRS transmissions of the first type in a last symbol of the normal uplink subframe. In such cases, the UE may assume a same configuration for the SRS transmission of the first type, which may be different from that of the SRS transmission of the second type even when SRS transmissions of the first type overlap or are configured for transmission in the last symbol of the normal uplink subframe.

Figure 5:
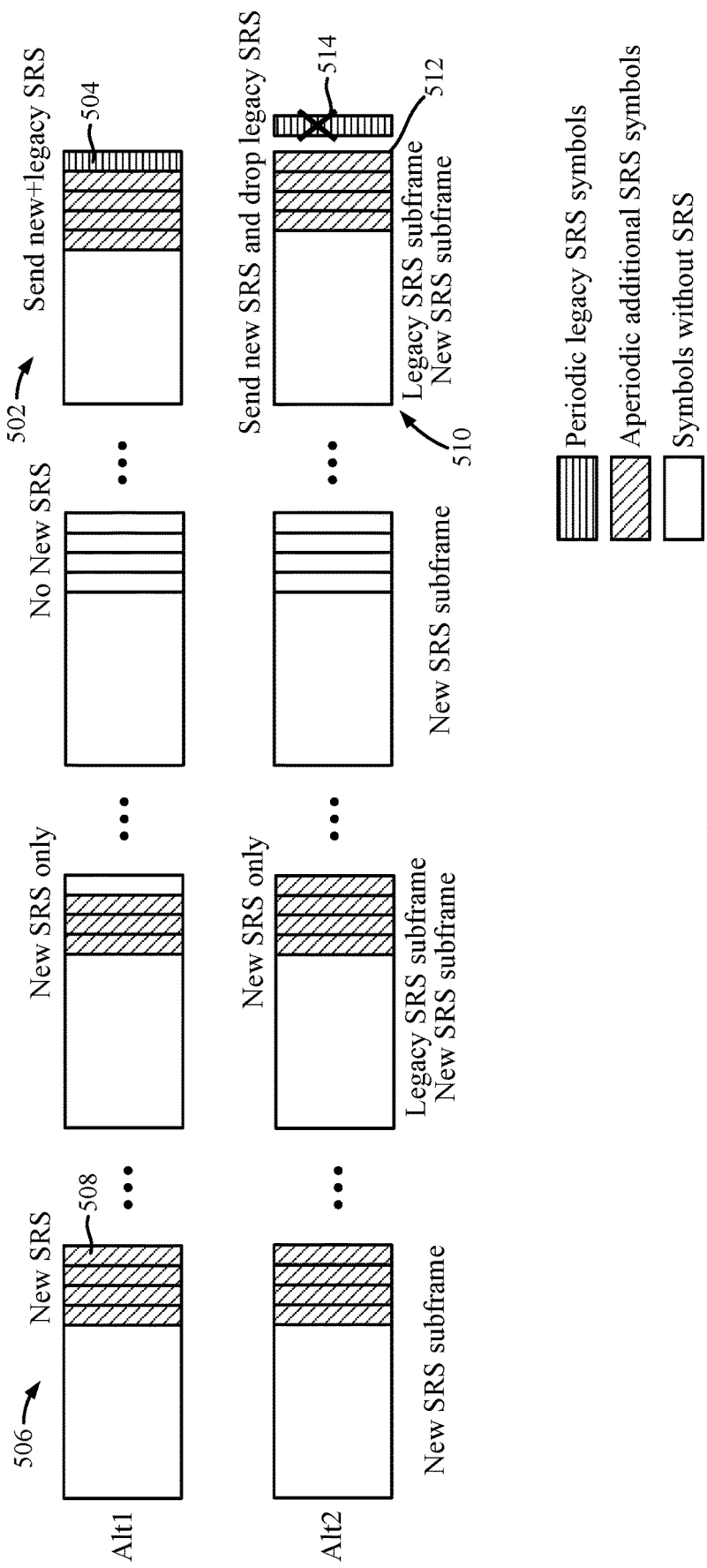
FIG. 5 illustrates different examples of SRS transmissions in symbols of subframes, in accordance with certain aspects of the present disclosure.

However, if the base station configures both SRS transmissions of the first type and SRS transmissions of the second type for transmission in the same normal uplink subframe, the SRS resources for the SRS transmissions of the first type may include different alternatives. For example, as illustrated in FIG. 5, in a first alternative (Alt 1), when SRS transmissions of the first type (e.g., "Additional SRS"/"New SRS" in FIG. 5) and SRS transmissions of the second type (e.g., "Legacy SRS" in FIG. 9) are configured in a same normal uplink subframe 502, the SRS resources (e.g., as indicated in the first configuration) for the SRS transmissions of the first type may not include a last symbol 504 of the normal uplink subframe. According to aspects, however, if only SRS transmissions of the first type are scheduled for transmission in a normal uplink subframe 506, the SRS resources for the SRS transmission of the first type may include the last symbol 508 of the normal uplink subframe.

In a second alternative (Alt 2), as illustrated in FIG. 5, when SRS transmissions of the first type and SRS transmissions of the second type are configured in a same normal uplink subframe 510 (e.g., as indicated by the first configuration and second configuration), the SRS resources for the SRS transmissions of the first type may include a last symbol 512 of the normal uplink subframe 510 (e.g., in which the SRS transmissions of the second type are also configured/scheduled). However, in this case, since the SRS transmissions of the first type and the SRS transmissions of the second type may collide in the last symbol 512 of the normal uplink subframe 510, the UE may determine which of the SRS transmissions of the first type or the SRS transmissions of the second type to transmit in the last symbol of the same uplink subframe based, at least in part, on a priority order, such as new A-SRS→legacy A-SRS→new P-SRS (if defined)→legacy P-SRS. With respect to this priority order, "new" may refer to SRS transmissions of the first type, "legacy" may refer to SRS transmissions of the second type, A-SRS may refer to aperiodic SRS, and P-SRS may refer to periodic SRS. For example, in some cases, as illustrated in FIG. 5, based on the priority order, when SRS transmissions of the first type and SRS transmissions of the second type are configured in a same normal uplink subframe 510, the UE may drop the SRS transmission of the second type 514 in the last symbol 512 of the normal uplink subframe 510 in favor of an SRS transmission of the first type.

According to aspects, in addition to the first configuration and second configuration indicating a subframe configuration for the SRS transmissions of the first type and the SRS transmissions of the second type, the first configuration may also indicate a symbol configuration within a subframe or a slot and/or a symbol configuration within the slot for the SRS transmissions of the first type. The second configuration may include an SRS symbol configuration that is fixed on the last symbol of a normal uplink subframe and, in some cases, a symbol configuration for special UpPTS SRS transmission of the second type.

For example, in some cases, the first configuration (e.g., for transmission of SRS transmissions of the first type) may include a slot index (e.g., 0 or 1) and a number of symbols (e.g., 1-6 symbols in second slot of a normal uplink subframe if excluding last symbol, or 1-7 symbols in the first slot or a second slot if including last symbol) for SRS transmissions of the first type in a normal uplink subframe.

Additionally, in some cases, the first configuration may include a list of SRS configurations per SRS symbol within a slot of a normal uplink subframe. In some cases, the first configuration (e.g., for transmission of SRS transmissions of the first type) may include a number of symbols in a normal uplink subframe (e.g., 1-13 symbols if excluding last symbol or 1-14 symbols if including last symbol). According to aspects, each of the SRS configurations in the list may indicate the symbol index, in the normal uplink subframe, for each symbol of the number of symbols to transmit the SRS transmissions of the first type.

Additionally, in some cases, each of the SRS configurations in the list may indicate the parameter sets for SRS transmission. The parameter sets for each SRS symbol may, in some cases, be independently indicated. In some cases, the first configuration may include a list of symbol indices, start symbol and symbol duration, or a symbol bitmap indicating the symbols in the normal uplink subframe to transmit the SRS transmissions of the first type. The first configuration may include the parameter sets for SRS transmission, which are common for SRS symbols. In some cases, the start symbol indicates an index from $1^{st}$ to $13^{th}$ symbol in a normal uplink subframe. Further, in some cases, the symbol duration indicates the number of the non-legacy SRS symbols configured between 1 to 13 symbols, which may also include the guard symbol if configured for the UE with SRS antenna switching and/or frequency hopping.

In some cases, the bitmap may include 6 bits or 7 bits that each correspond to a different symbol within a slot of the normal uplink subframe (e.g., 6 bits if SRS transmissions of the first type are not allowed within the last symbol of the second slot of the normal uplink subframe, otherwise 7 bits maximum). In some cases, the bitmap may include 13 bits or 14 bits that correspond to a different symbol within a normal uplink subframe (e.g., 13 bits if SRS transmissions of the first type are not allowed within the last symbol of the normal uplink subframe, otherwise 14 bits maximum). In some cases, the slot configuration may be predefined to be the first slot or the second slot, if not explicitly indicated by the base station.

According to aspects, the UE may use the slot/symbol configuration within the first configuration to determine where and when to transmit the SRS transmissions of the first type within a normal uplink subframe.

Additionally, in some cases, the first configuration may include configuration information for one or more of SRS antenna switching, frequency hopping, or repetition for transmitting the SRS transmissions of the first type. For example, in some cases, the first configuration may include SRS repetition pattern for the one or more SRS transmissions of the first type, which the UE may use when transmitting the SRS transmissions of the first type. According to aspects, the SRS repetition pattern may indicate a first SRS transmission of one or more SRS transmissions of the first type is to be repeated in a number of symbols (e.g., a number of SRS repetition symbols) of a normal uplink subframe using a same antenna transmission port, antenna, subband, and transmission power. In some cases, the number of SRS repetition symbols may be no larger than total number of SRS symbols in the normal uplink subframe. According to aspects, a repetition pattern may be used when intra-subframe SRS antenna switching/frequency hopping is enabled, where the repetition pattern may be predefined as, for example, first repeat SRS on same antenna transmission port/antenna/subband/transmission power and then switch antenna and/or subband. In some cases, by default, if the base station does not include specific signaling in the first configuration indicating a repetition pattern, the UE may understand that the number of repetitions is 1 (e.g., no repetition). In some case, if SRS antenna switching/frequency hopping is not enabled, the SRS may be transmitted over wideband on same antenna port/antenna, and therefore same SRS transmissions may be repeated on each SRS symbol. In this case, there may be no need to indicate the number of SRS repetition symbols. As noted, the UE may transmit the SRS transmissions of the first type according to the repetition pattern received in the first configuration.

As noted, the first configuration may include configuration information for intra-subframe antenna switching for transmitting the SRS transmissions of the first type within a normal uplink subframe. For example, the first configuration may include an indication of whether intra-subframe antenna switching is enabled or disabled in a normal uplink subframe (e.g., for transmitting the SRS transmissions of the first type). According to aspects, if intra-subframe antenna switching is enabled, the UE may use a first antenna or a first antenna group for transmitting a first SRS transmission of the first type in the normal uplink subframe (e.g., in a first symbol of the normal uplink subframe). Thereafter, the UE may then switch to using a second antenna or a second antenna group for transmitting a second SRS transmission of the first type in the normal uplink subframe (e.g., in a second symbol of the normal uplink subframe). It should be noted that the first symbol of the normal uplink subframe and second symbol of the normal uplink subframe may refer to any symbol with normal uplink subframe and not necessarily to the actual first and second symbols of the normal uplink subframe.

According to aspects, if antenna switching is enabled, the base station may receive a first SRS transmission of the first type in the at least one uplink subframe to obtain channel information of a first antenna at the UE or a first antenna group at the UE. The base station may then receive a second SRS transmission of the first type in the at least one uplink subframe to obtain channel information of a second antenna at the UE or a second antenna group at the UE.

According to aspects, if antenna switching is disabled, the UE may not switch antennas while transmitting the SRS transmissions of the first type in the normal uplink subframe. Additionally, according to aspects, the configuration information for antenna switching for SRS transmission of the first type may include configuration information for SRS antenna switching 1T2R, 1T4R, and/or 2T4R, which may be different from that of SRS transmission of the second type, where, for example, xT refers to the number (x) of transmit antennas T and xR refers to the number (x) of receive antennas R. In some cases, a UE could be configured with SRS antenna switching 1T2R or 1T4R, which selects one antenna among two or four antennas, or SRS antenna switching 2T4R, which selects one a pair of two antenna ports among predefined two pairs or three pairs of antennas, depending on the UE capability per band. In some cases, a UE may be configured with a guard period, such as a symbol between every antenna switching for UE processing. For the SRS transmission of the first type (e.g., aperiodic non-legacy SRS transmission), the number of the antenna switches (e.g., the number of times that an antenna/antenna group switches) in a normal uplink subframe may be a full set of SRS antenna switching, such as 2 for SRS 1T2R or SRS 2T4R with 2 pairs of antennas, 3 for SRS 2T4R with 3 pairs of antennas, or 4 for SRS 1T4R.

In some cases, by default, if the base station does not include explicit signaling indicating the antenna switching configuration information (e.g., related to 1T2R, 1T4R, and/or 2T4R) for the second type, the UE may use the same configuration as for SRS antenna switching of the first type. In some cases, the base station may include explicit signaling indicating the antenna switching configuration information (e.g., related to 1T2R, 1T4R, and/or 2T4R) for A-SRS only, which may be different from that of the SRS antenna switching of P-SRS. Otherwise, the UE may assume the same configuration of SRS antenna switching for A-SRS and P-SRS.

In some cases, the first configuration may include a starting antenna index (e.g., for 1T2R or 1T4R) or an antenna group index (e.g., for 2T4R) for intra-subframe SRS antenna switching. According to aspects, in some cases, by default, the UE may start from antenna 0 (zero) or antenna group 0 (zero) if the number of symbols within the normal uplink subframe is equal to the number of antennas as the UE.

As noted, the first configuration may include configuration information for intra-subframe frequency hopping for transmitting the SRS transmissions of the first type within a normal uplink subframe. For example, the first configuration may include an indication of whether intra-subframe frequency hopping is enabled or disabled in a normal uplink subframe (e.g., for transmitting the SRS transmissions of the first type). According to aspects, if frequency hopping is enabled, the UE may use a first subband for transmitting a first SRS transmission of the first type in a normal uplink subframe (e.g., in a first symbol of the normal uplink subframe). Thereafter, the UE may then switch to using a second subband for transmitting a second SRS transmission of the first type in the at least one uplink subframe (e.g., in a second symbol of the normal uplink subframe). Similarly, if frequency hopping is enabled, the base station may receive a first SRS transmission of the first type in the at least one uplink subframe to obtain channel information on a first subband and receive a second SRS transmission of the first type in the at least one uplink subframe to obtain channel information on a second subband.

Further, according to aspects, if intra-subframe frequency hopping is enabled, the first configuration may include an indication of a hopping bandwidth for the UE to perform frequency hopping during transmission of the SRS transmissions of the first type in the normal uplink subframe. In some cases, the hopping bandwidth may be indicated as a total SRS bandwidth divided by a configured number of SRS transmissions of the first type in the normal uplink subframe. In some cases, the hopping bandwidth configured for the SRS transmission of the first type may be the same or different from that of SRS transmission of the second type. If the BS does not provide an explicit indication of hopping bandwidth, by default, the UE may assume the same hopping bandwidth for the first and second type of SRS transmissions. Additionally, the first configuration may include an indication of a starting frequency location in the hopping bandwidth to perform the frequency hopping during transmission of the SRS transmissions of the first type in the normal uplink subframe. According to aspects, the starting frequency location may include at least one of a subband index or a physical resource block. The UE may then transmit SRS transmissions of the first type according to, for example, the hopping bandwidth indication and the starting frequency location. In some cases, a UE could be configured with a guard period, such as a guard symbol between every frequency hopping for UE processing. For the SRS transmission of the first type (e.g., aperiodic non-legacy SRS transmission) the number of the frequency hops in a normal uplink subframe can be a full set of SRS subbands or a subset of SRS subbands. The total number of SRS subbands may be dependent on the configured SRS bandwidth and the subband size of hopping bandwidth configured for the non-legacy SRS symbols. Additionally, the number of SRS subbands within a normal uplink subframe for intra-subframe aperiodic SRS transmission of the first type may be dependent on the total number of OFDM symbols configured and the guard symbol (if configured) for frequency hopping. Further, if antenna switching and frequency hopping are enabled for intra-subframe aperiodic SRS transmission of the first type, the number of SRS subbands within a normal uplink subframe may also be dependent on a number of antenna switches (if configured) and the guard symbol (if configured) for antenna switching.

In some cases, if intra-subframe frequency hopping is disabled (e.g., as indicated in the first configuration) the UE may not change subbands while transmitting SRS transmissions of the first type. If the hopping bandwidth is smaller than an SRS bandwidth, whether the UE changes the frequency subbands per symbol or per subframe may be configured by using the enable/disable bit for intra-subframe frequency hopping. Note that the enable/disable bit for intra-subframe frequency hopping and enable/disable bit for intra-subframe antenna switching may be independently configured or combined together by the base station. If using a combined bit, the intra-subframe frequency hopping and antenna switching may be concurrently enabled or disabled. It is also dependent on the guard period configuration for SRS antenna switching and frequency hopping, respectively. For example, if a UE is configured with no guard period for SRS frequency hopping but guard period for SRS antenna switching, the UE carries out the frequency hopping before the antenna switching; if a UE is configured with guard period for SRS frequency hopping but no guard period for SRS antenna switching, the UE carries out the antenna switching before frequency hopping; if a UE with configured with no guard symbol or guard symbol same for SRS antenna switching and frequency hopping, the UE concurrently carries out the frequency hopping and antenna switching, i.e., switch the antenna and subband at same time.

In some cases, when SRS transmissions of the first type and SRS transmissions of the second type are configured/scheduled within a same subframe, the UE may determine whether the first configuration for SRS transmissions of the first type and the second configuration for SRS transmissions of the second type are complimentary to each other. In some cases, the UE's determination of whether the first configuration and the second configuration are complementary to each other may be based on signaling received from the base station.

For example, when SRS transmissions of the first type (e.g., non-legacy aperiodic SRS transmission) and SRS transmissions of the second type (e.g., legacy periodic/aperiodic SRS transmissions) are configured to be transmitted in the same subframe, the base station may transmit signaling (e.g., srs-ConfigComplementaryAp) to enable/disable configuration of a symbol number and pattern for SRS transmissions of the first type taking into account the SRS transmissions of the second type in the same subframe.

For example, if the UE determines that the first configuration and the second configuration are complementary to each other, the UE may take the SRS transmissions of the second type into account when determining how to transmit the SRS transmissions of the first type. That is, for example, the UE may adjust configuration parameters for the SRS transmissions of the first type depending on those of second type, such as a number of symbols for the SRS transmissions of the first type, an antenna index/antenna group index, and/or subband.

Figure 6C:
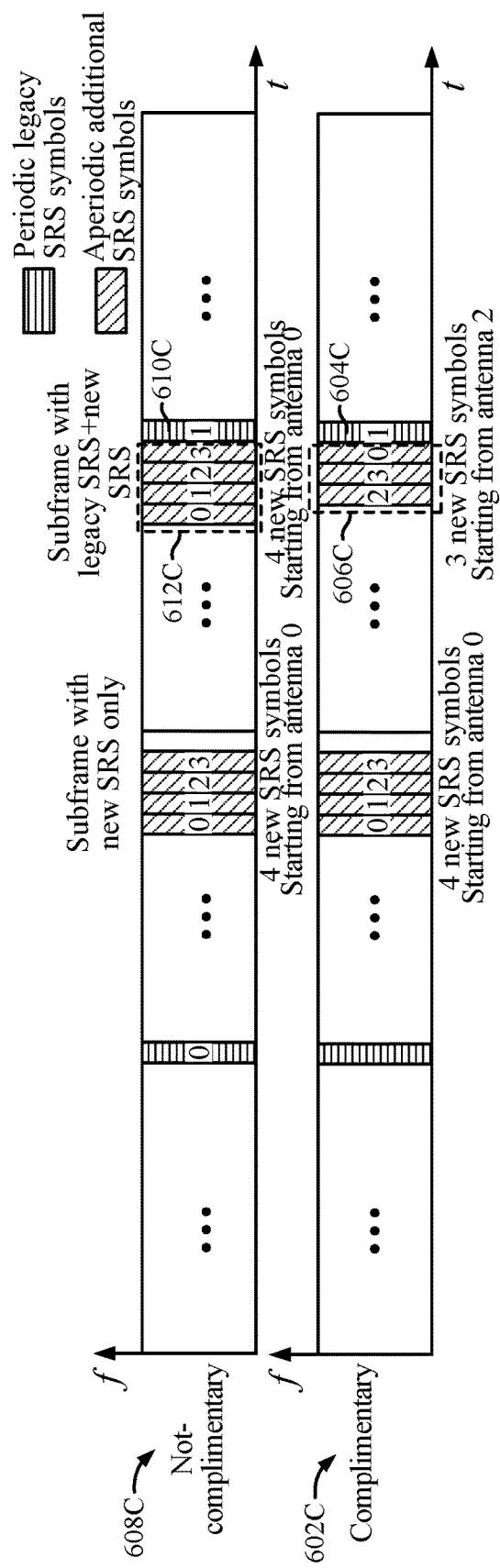

FIGS. 6A-6D illustrate different examples of adjusting configuration parameters for SRS transmissions of the first type depending on those of second type, according to aspects presented herein. For example, as illustrated at 602A in FIG. 6A, if the first configuration and second configuration are determined not to be complementary to each other, the UE may consider the SRS transmissions of the first type and the SRS transmissions of the second type to be independent from each other. For example, as illustrated at 604A, if the first configuration and second configuration are not complementary to each other (e.g., in some cases determined based on an indication from the base station), the UE may transmit the SRS transmissions of the first type (e.g., aperiodic additional SRS symbols, as shown in FIG. 6A) and the SRS transmissions of the second type (e.g., periodic legacy SRS symbols, as shown in FIG. 6A) in the same normal uplink subframe independently from each other (e.g., configuration parameters of the SRS transmissions of the first type are not adjusted by the UE based on configuration parameters of the SRS transmissions of the second type).

Additionally, as illustrated at 606A in FIG. 6A, if the first configuration and the second configuration are determined to be complementary to each other and if the UE is configured with N symbols for the SRS transmissions of the first type, the UE may select N SRS symbols 608A for the SRS transmissions of the first type in the case of no SRS transmissions of the second type are configured in a same subframe or may select (N−1) SRS symbols 610A for the SRS transmissions of the first type in the case that there is one SRS transmission of the second type configured in a same subframe.

For example, if the first configuration and the second configuration are determined to be complementary to each other (e.g., based on an indication provided by the base station), the UE may determine a number of the SRS transmissions of the first type to transmit in the same uplink subframe based on, for example, a number SRS transmissions of the second type configured for transmission in the same normal uplink subframe. In some cases, determining the number of SRS transmissions of the first type to transmit may include reducing the one or more SRS transmissions of a first type by the number of SRS transmissions of the second type configured for transmission in the same uplink subframe, for example, as illustrated at 610A in FIG. 6A. Thereafter, the UE may transmit the SRS transmissions of the first type according to the determined number of SRS transmissions of the first type and transmit the SRS transmissions of the second type according to the determined number of SRS transmissions of the second type.

It should be noted that FIG. 6A relates to configuring legacy (e.g., SRS transmissions of the second type) periodic SRS transmissions without antenna switching/frequency hopping enabled in a same normal uplink subframe in which SRS transmissions of the first type are configured (e.g., aperiodic SRS transmissions of the first type). FIG. 6B illustrates the case of configuring legacy (e.g., SRS transmissions of the second type) aperiodic SRS transmissions without antenna switching/frequency hopping enabled in a same normal uplink subframe in which SRS transmissions of the first type (e.g., aperiodic SRS transmissions of the first type) are configured.

In some cases, a repetition pattern may be enabled for the SRS transmissions of the first type in FIGS. 6A and 6B. In this case, an SRS transmission of the first type may be repeated a plurality of times, while still taking into account the SRS transmission of the second type in the same normal uplink subframe. For example, in some cases, as illustrated at 610A, a first SRS transmission of the first type may be repeated three times in a normal uplink subframe while still allowing for an SRS transmission of the second type in the same normal uplink subframe.

Additionally, as noted above, if the first configuration and the second configuration are determined to be complementary, the UE may take into account at least one of an antenna or an antenna group used for transmitting the SRS transmissions of the second type when configuring/transmitting the SRS transmissions of the first type. For example, FIG. 6C illustrates configuring a legacy (e.g., SRS transmissions of the second type) periodic SRS with inter-subframe AS 1T4R and new (e.g., SRS transmissions of the first type) aperiodic SRS intra-subframe AS 1T4R in a normal uplink subframe, according to certain aspects herein.

As illustrated, when antenna switching is enabled and the first configuration and the second configuration are complimentary (e.g., as illustrated at 602C), the UE may take into account the antenna used for transmitting the SRS transmissions of the second type when transmitting the SRS transmissions of the first type. For example, as illustrated, if the SRS transmission of the second type is configured for transmission on antenna 1 as illustrated at 604C, the SRS transmissions of the first type may be configured for transmission on antennas other than antenna 1 (e.g., antennas 2, 3, and 0) as illustrated at 606C. In other words, if the first configuration and the second configuration are complementary, the UE may determine not to use a same antenna or same antenna group used for transmitting the SRS transmissions of the second type when transmitting the SRS transmissions of the first type.

However, if the first configuration and the second configuration are not complimentary (e.g., as illustrated at 608C) and if the SRS transmission of the second type is configured for transmission on antenna 1 as illustrated at 610C, the UE may not take this antenna information into account and may still transmit the SRS transmissions of the first type using antenna 1, for example, as illustrated at 612C.

Figure 6D:
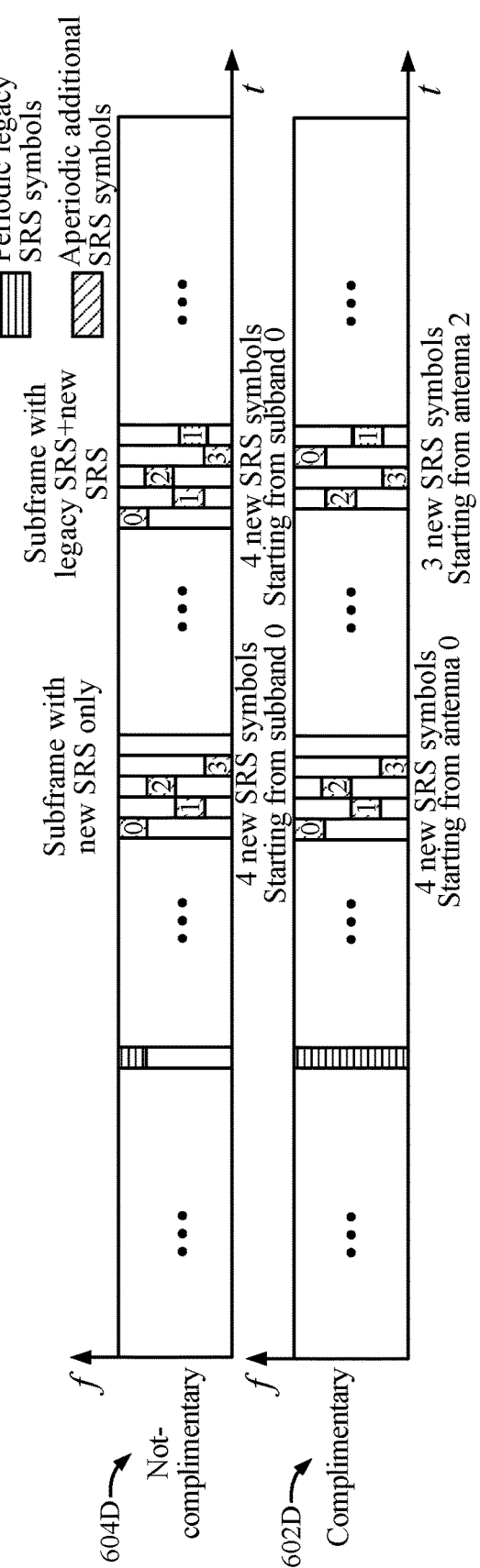

Additionally, as noted above, if the first configuration and the second configuration are determined to be complementary, the UE may take into account a subband used for transmitting the SRS transmissions of the second type when configuring/transmitting the SRS transmissions of the first type. For example, FIG. 6D illustrates configuring a legacy (e.g., SRS transmissions of the second type) periodic with inter-subframe frequency hopping and new (e.g., SRS transmissions of the first type) aperiodic SRS intra-subframe frequency hopping in a normal uplink subframe, according to certain aspects herein. As illustrated, when frequency hopping is enabled and the first configuration and the second configuration are complimentary as illustrated at 602D, the UE may take the subband used for transmitting the SRS transmissions of the second type into account when transmitting the SRS transmissions of the first type. For example, as illustrated, if the SRS transmission of the second type is configured for transmission on subband 1, the SRS transmissions of the first type may be configured for transmission on subbands other than subband 1, such as subbands 0, 2, and 3. In other words, if the first configuration and the second configuration are complementary, the UE may determine not to use a same subband used for transmitting the SRS transmissions of the second type when transmitting the SRS transmissions of the first type.

However, if the first configuration and the second configuration are not complimentary (e.g., as illustrated at 604D) and if the SRS transmission of the second type is configured for transmission on subband 1, the UE may not take this subband information into account and may still transmit the SRS transmissions of the first type using subband 1, as illustrated.

According to aspects, on the base station side, after the SRS transmissions of the first type and the SRS transmissions of the second type have been transmitted by the UE, the base station may receive and combine the SRS transmissions of the first type with the SRS transmission of the second type in the same normal uplink subframe (e.g., in some cases, with same or different power control). According to aspects, aperiodic SRS repetition on (N−1) new SRS symbols together with one legacy symbol may achieve similar combining gain of N SRS repetitions. Additionally, aperiodic SRS antenna switching on additional SRS symbols may only need to switch the antennas not used for the legacy SRS symbol. The transmission power for SRS transmissions of the first type may also be aligned with that for SRS transmissions of the second type if the higher layer signaling (e.g., srs-ConfigComplementaryAp) is indicated to enable complementary configuration, so that the unnecessary power change may be reduced at the UE side and it is easier for the base station to combine/merge the SRS transmissions of the first and second type together.

According to aspects, in some cases, the UE may receive signaling from the base station that includes a trigger indication of whether the one or more SRS transmissions of the first type and the one or more SRS transmissions of the second type are allowed to be transmitted in a same normal uplink subframe. In some cases, the trigger indication may be received in downlink control information signaling or a radio resource control message transmitted by the base station.

For example, in some cases, the UE may receive a trigger indication from the base station indicating that SRS transmissions of the first type and SRS transmissions of the second type are not allowed (e.g., are disabled) in a same normal uplink subframe. In this case, if SRS transmissions of the first type and SRS transmissions of the second type are scheduled to be transmitted in the same normal uplink subframe (e.g., based on the first configuration and second configuration), the UE may determine which of the first configuration or the second configuration to use for transmitting SRSs, for example, based on a priority order. For example, in some cases, the UE may determine to use the first configuration and transmit SRS transmissions of the first type in the normal uplink subframe and to drop SRS transmissions of the second type in the normal uplink subframe (e.g., based on the UE receiving a trigger indication, indicating SRS transmissions of the first type and SRS transmissions of the second type are not allowed to both occur within the same normal uplink subframe).

In some cases, the UE may receive a trigger indication from the base station indicating that both SRS transmissions of the first type and SRS transmissions of the second type are allowed (e.g., are enabled) to be transmitted in a same normal uplink subframe. In this case, the UE may determine to use both the first configuration and the second configuration to transmit the SRS transmissions of the first type and the SRS transmissions of the second type in the same normal uplink subframe. For example, in this case, the UE may transmit the SRS transmissions of the first type according to the first configuration and transmit the SRS transmissions of the second type according to the second configuration. In some cases, SRS transmission of the first type and SRS transmission of the second type cannot be configured or triggered in the same subframe. For example, when the UE is supporting carrier aggregation, the SRS transmission of the first type may be configured to be transmitted in the secondary (SCell) without PUSCH/PUCCH and the SRS transmission of the second type may be configured to be transmitted in the SCell without PUSCH/PUCCH (e.g., for SRS carrier switching). In this case, the UE may not be expected to be configured or triggered to transmit the SRS of the first type and SRS of the second type at the same time.

According to certain aspects, when the UE receives a trigger indication from the base station, the UE may determine a first valid normal uplink subframe to commence transmission of SRSs. For example, upon detection of a positive SRS request in subframe n (e.g., the UE receives a trigger indication in subframe n enabling SRS transmission of the first type in a normal uplink subframe), the UE may determine the first valid subframe for transmitting SRSs according to: n+k, where k>=$k_p$, and where $k_p$ may be predefined (e.g., $k_p$=4). In other words, the UE may determine the timing of the one or more SRS transmissions of the first type with the latency no less than that a minimum value after its corresponding trigger indication, which is similar as that of the one or more SRS transmissions of the second type. According to aspects, if the first valid subframe is at subframe n+$k_p$, the SRS may be transmitted by the UE with minimum latency of $k_p$ subframes, which may be the minimum processing time for preparing SRS transmission after the trigger indication. According to aspects, if the first valid subframe is at subframe n+k, later than subframe n+$k_p$, the SRS may be transmitted by the UE with latency of more than $k_p$ subframes, still satisfying the processing time for preparing SRS transmission after the trigger indication received from the base station. In certain cases, some UEs, for example, who inform the base station of the capability of the UE that is less than the required minimum processing time after the trigger indication, may be configured by the BS to transmit SRS in the first valid subframe according to n+k, where k>=$k_p$, and where $k_p$ may be configurable based on the reported minimum processing time to be a value smaller than 4.

In some cases, the determination of the valid subframe for commencing transmission of SRS may satisfy ($k_{SRS}$+$T_{offset,1}$)mod $T_{SRS,1}$=0, where $T_{SRS,1}$ and $T_{offset,1}$ are the periodicity and subframe offset configured for the SRS transmission of the first type, e.g., aperiodic SRS for non-legacy SRS symbols. In some cases, by default, the parameters can be same as those of the SRS transmission of the second type (e.g., aperiodic SRS for legacy SRS symbols).

According to aspects, the UE may have a power change limitation defined as a limited number of power changes within a subframe within a normal uplink subframe that may be taken into account when transmitting SRS transmissions of the first type and SRS transmissions of the second type within the same normal uplink subframe. For example, in some cases, the base station may take into account the UE's capability when configuring the number of SRS transmissions of the first type satisfying the power change requirement. For example, when configuring the number of SRS transmission of the first type in a normal uplink subframe that does not include any SRS transmissions of the second type, the base station may take into account a power change of the SRS transmissions of the first type due to SRS antenna switching/frequency hopping. According to aspects, when the normal uplink subframe includes both SRS transmissions of the first type and SRS transmissions of the second type, a difference in power between SRS transmissions of the first type and SRS transmissions of the second type may still result in power change even without antenna switching/frequency hopping that may need to be taken into account by the base station.

Thus, according to aspects, the base station may configure a similar power control for SRS transmissions of the first type and SRS transmissions of the second type to reduce a power change. For example, the base station may determine a first indication of a transmission power for transmitting the SRS transmissions of the first type and a second indication of a transmission power for transmitting the SRS transmissions of the second type. In some cases, the base station may configure the first indication of the transmission power and the second indication of the transmission power to reduce a power change between SRS transmissions of the first type and SRS transmission of the second type. According to aspects, the base station may then transmit signaling to the UE indicating the first indication of the transmission power for transmitting the SRS transmissions of the first type and the second indication of the transmission power for transmitting the SRS transmissions of the second type.

In some cases, however, if the power change between the SRS transmissions of the first type and the SRS transmissions of the second type is out of the UE's capability, the UE may determine which of the first configuration or the second configuration to use to transmit SRSs. In some cases, this determination may be based on a priority order (e.g., new/ additional A-SRS→legacy A-SRS→legacy P-SRS). For example, in some cases, if the power change between the SRS transmissions of the first type and the SRS transmissions of the second type is out of the UE's capability, the UE may determine to use the first configuration to transmit SRS transmissions of the first type (e.g., new A-SRS corresponds to the SRS transmissions of the first type) while dropping SRS transmissions of the second type (e.g., legacy A-SRS or legacy P-SRS corresponds to the SRS transmissions of the second type).

According to aspects, in some cases, the first configuration for SRS transmission of the first type may be indicated on a per-component-carrier (e.g., PCell and SCell) or per-component-carrier-group basis. According to aspects, some parameters for SRS transmission of the first type on multiple CCs may have additional restriction for SRS carrier switching (CS). In some cases, for SRS CS (e.g., for TDD serving cell configured for PUSCH/PUCCH) intra-subframe SRS FH/AS in UpPTS for legacy UEs configured with srs-UpPtsAdd may be supported. Thus, by default, for SRS CS, the UE configured with new/additional SRS symbols (e.g., SRS transmissions of the first type) may support intra-subframe SRS frequency hopping/antenna switching (SRS FH/AS) in normal uplink subframes and may follow the same behaviors as that of UEs configured with SRS CS and srs-UpPtsAdd.

According to aspects, in some cases, periodic SRS on additional SRS symbols can be regarded as the SRS of first type and the legacy periodic or aperiodic SRS on last symbol in normal uplink subframes and symbol(s) in UpPTS may correspond to the SRS of the second type. The SRS of the first type and second type may be transmitted in the same or different subframes. Some RRC configuration parameters for aperiodic SRS on additional SRS symbols in normal uplink may be similar as those of periodic SRS, such as srs-ConfigIndex for periodicity and subframe offset, slot/ symbol index configuration, antenna configuration for SRS antenna switching, hopping bandwidth for SRS frequency hopping, number of SRS repetition, enabling/disabling bit for intra-subframe SRS antenna switching/frequency hopping, enabling/disabling bit for complementary configuration of SRS first type and second type, and the like. Different from aperiodic SRS transmission, the periodic SRS transmission may not need to be triggered by using DCI bits.

Figure 7:
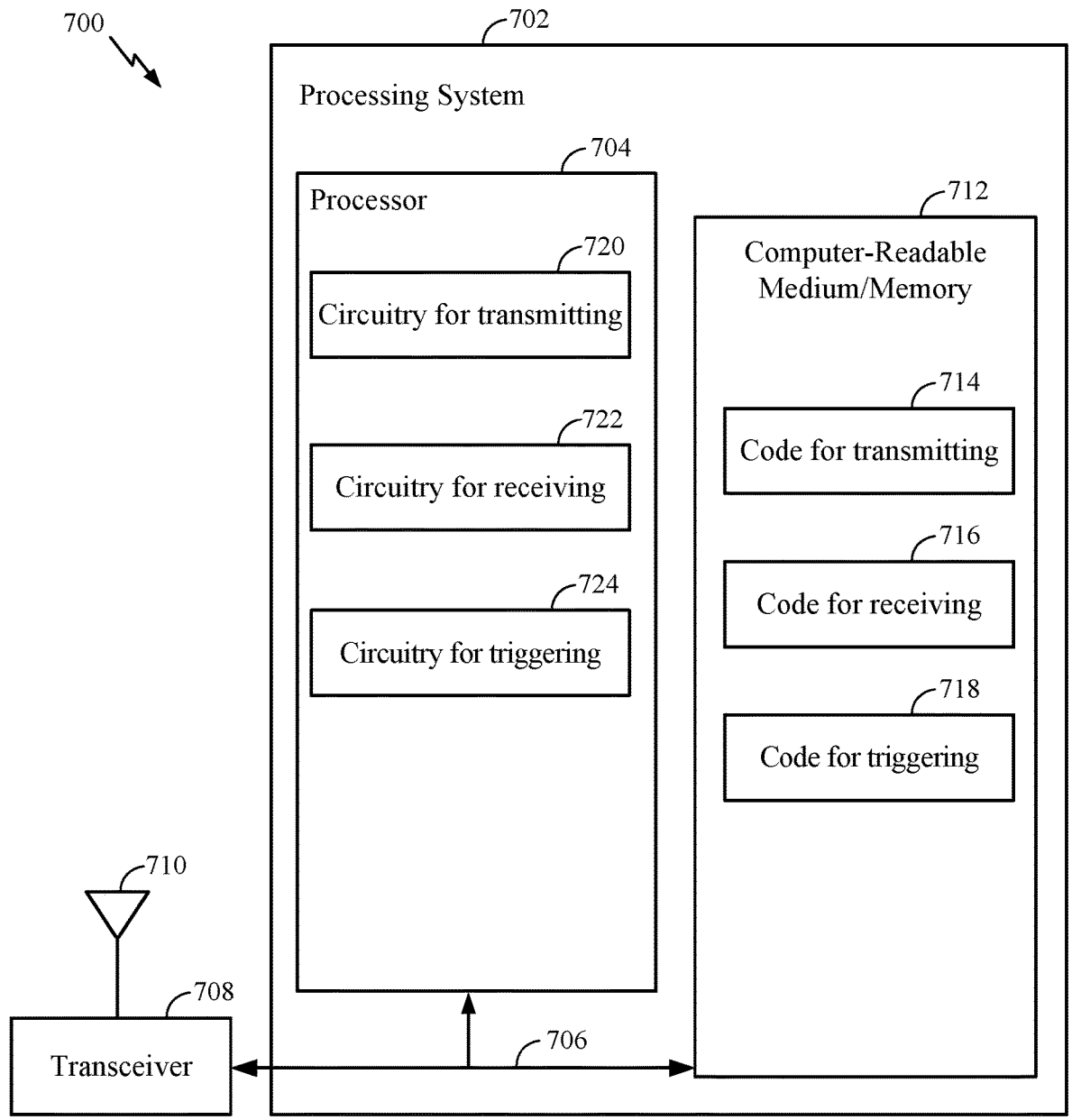
FIG. 7 illustrates a communications device that may include various components configured to perform operations for the techniques disclosed herein in accordance with aspects of the present disclosure.

FIG. 7 illustrates a communications device 700 that may include various components (e.g., corresponding to means-plus-function components) configured to perform operations for the techniques disclosed herein, such as the operations illustrated in FIG. 3 as well as other operations disclosed herein for aperiodic SRS transmission on additional SRS symbols. The communications device 700 includes a processing system 702 coupled to a transceiver 708. The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/ memory 712 is configured to store instructions (e.g., computer-executable code) that when executed by the processor 704, cause the processor 804 to perform the operations illustrated in FIG. 3, or other operations for performing the various techniques discussed herein for aperiodic SRS transmission on additional SRS symbols. In certain aspects, computer-readable medium/memory 712 stores code for performing the operations illustrated in one or more of FIG. 3 as well as other operations disclosed herein for aperiodic SRS transmission on additional SRS symbols. For example, computer-readable medium/memory 712 stores code 714 for transmitting, code 716 for receiving, and code 718 for triggering.

In certain aspects, the processor 704 may include circuitry configured to implement the code stored in the computer-readable medium/memory 712, such as for performing the operations illustrated in FIG. 3 as well as other operations disclosed herein for aperiodic SRS transmission on additional SRS symbols. For example, the processor 804 includes circuitry 720 for transmitting, circuitry 722 for receiving, and circuitry 724 for triggering.

Figure 8:
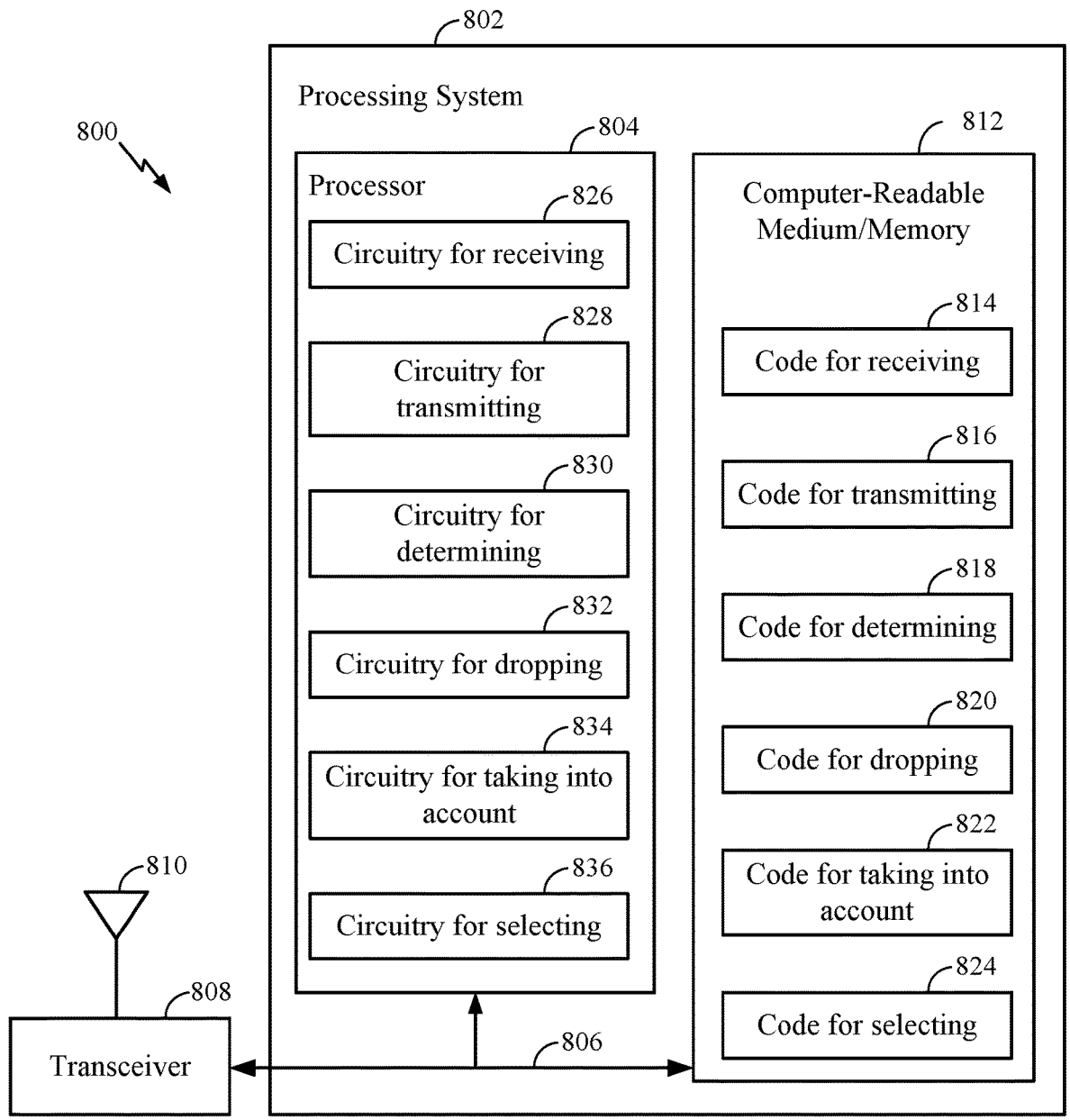
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 4 as well as other operations disclosed herein for aperiodic SRS transmission on additional SRS symbols. The communications device 800 includes a processing system 802 coupled to a transceiver 808. The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 904 to perform the operations illustrated in FIG. 4, or other operations for performing the various techniques discussed herein for aperiodic SRS transmission on additional SRS symbols. In certain aspects, computer-readable medium/memory 812 stores code for performing the operations illustrated in one or more of FIG. 4 as well as other operations disclosed herein for aperiodic SRS transmission on additional SRS symbols. For example, computer-readable medium/memory 812 stores code 814 for receiving, code 816 for transmitting, code 818 for determining, code 820 for dropping, code 822 for taking into account, and code 824 for selecting.

In certain aspects, the processor 804 may include circuitry configured to implement the code stored in the computer-readable medium/memory 812, such as for performing the operations illustrated in FIG. 4 as well as other operations disclosed herein for aperiodic SRS transmission on additional SRS symbols. For example, the processor 804 includes circuitry 826 for receiving, circuitry 828 for transmitting, circuitry 830 for determining, circuitry 832 for dropping, circuitry 834 for taking into account, and circuitry 836 for selecting.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of a list of" items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 3-4.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications by a user equipment (UE) in a network, comprising:
   receiving, from the network, signaling indicating, for a set of uplink subframes, a first configuration for transmitting one or more SRS transmissions of a first type and a second configuration for transmitting one or more SRS transmission of a second type, wherein the first configuration indicates an SRS repetition pattern for the one or more SRS transmissions of the first type; and
   transmitting, within at least one uplink subframe of the set of uplink subframes, at least one of the one or more SRS transmissions of the first type or the one or more SRS transmissions of the second type based, at least in part, on at least one of the first configuration or the second configuration, wherein transmitting, within the at least one uplink subframe of the set of uplink subframes, comprises transmitting the one or more SRS transmissions of the first type further based on the SRS repetition pattern.

2. The method of claim 1, wherein:
   a resource configuration for the one or more SRS transmissions of the first type is different from that of the one or more SRS transmissions of the second type in the at least one uplink subframe; and
   the one or more SRS transmissions of the first type are triggered in a same or a different way from that of the one or more SRS transmissions of the second type.

3. The method of claim 1, wherein:
   the one or more SRS transmissions of the first type comprise non-legacy SRS transmissions not located in the last symbol of the at least one uplink subframe;
   the non-legacy SRS transmissions comprise at least one of one of periodic SRS transmissions or aperiodic SRS transmissions;
   the one or more SRS transmissions of the second type comprise legacy SRS transmissions located in at least one of the last symbol of the at least one uplink subframe; and
   the legacy SRS transmissions comprise at least one of periodic SRS transmissions or aperiodic SRS transmissions.

4. The method of claim 1, wherein the first configuration indicates a periodicity and subframe offset for transmitting the one or more SRS transmissions of the first type, wherein the periodicity and subframe offset for transmitting the one or more SRS transmissions of the first type is the same or different from a periodicity and subframe offset for the one or more SRS transmissions of the second type.

5. The method of claim 1, wherein:
   the first configuration indicates a first uplink subframe for transmission of the one or more SRS transmissions of the first type that does not overlap with a second uplink subframe, indicated in the second configuration, for transmission of the one or more SRS transmissions of the second type; and
   transmitting, within the at least one uplink subframe of the set of uplink subframes, includes transmitting at least one SRS transmission of the one or more SRS transmissions of the first type in a last symbol of the at least one uplink subframe.

6. The method of claim 1, wherein the first configuration indicates at least one of:
   a list of symbol indices, a starting symbol, a duration of symbols, and a guard symbol, if configured, for transmitting the one or more SRS transmissions of the first type; or
   a symbol bitmap indicating the symbols in the at least one uplink subframe for transmitting the one or more SRS transmissions of the first type.

7. The method of claim 1, wherein the first configuration indicates a slot index of the at least one uplink subframe for transmitting the one or more SRS transmissions of the first type.

8. The method of claim 1, wherein the SRS repetition pattern indicates a first SRS transmission of the one or more SRS transmissions of the first type is to be repeated in a number of symbols in the at least one uplink subframe using a same antenna transmission port, antenna, and subband before switching the antenna or the subband.

9. A method of wireless communications by a user equipment (UE) in a network, comprising:
   receiving, from the network, signaling indicating, for a set of uplink subframes, a first configuration for transmitting one or more SRS transmissions of a first type and a second configuration for transmitting one or more SRS transmission of a second type, wherein the first configuration includes an indication of whether intra-subframe SRS antenna switching is enabled or disabled for at least one uplink subframe;
   transmitting, within the at least one uplink subframe of the set of uplink subframes, at least one of the one or more SRS transmissions of the first type or the one or more SRS transmissions of the second type based, at least in part, on at least one of the first configuration or the second configuration; and
   if antenna switching is enabled, using a first antenna or a first antenna group for transmitting a first SRS transmission of the one or more SRS transmissions of the first type in the at least one uplink subframe and switching to using a second antenna or a second antenna group for transmitting a second SRS transmission of the one or more SRS transmissions of the first type in the at least one uplink subframe.

10. The method of claim 9, wherein the first configuration includes:
    an indication of an SRS antenna switching pattern configuration for the intra-subframe SRS antenna switching; and an indication of whether a guard symbol is to be inserted between switching antennas or antenna groups.

11. The method of claim 9, wherein the intra-subframe SRS antenna switching includes a full set of antenna or antenna group switching within SRS symbols configured for transmitting the one or more SRS transmissions of the first type.

12. The method of claim 9, wherein the first configuration includes a starting antenna index or a starting antenna group index to perform antenna switching during transmission of the one or more SRS transmissions of the first type in the at least one uplink subframe, and wherein the starting antenna index or the starting antenna group index is zero.

13. A method of wireless communications by a user equipment (UE) in a network, comprising:
receiving, from the network, signaling indicating, for a set of uplink subframes, a first configuration for transmitting one or more SRS transmissions of a first type and a second configuration for transmitting one or more SRS transmission of a second type, wherein the first configuration includes an indication of whether intra-subframe SRS frequency hopping is enabled or disabled for at least one uplink subframe;
transmitting, within the at least one uplink subframe of the set of uplink subframes, at least one of the one or more SRS transmissions of the first type or the one or more SRS transmissions of the second type based, at least in part, on at least one of the first configuration or the second configuration; and
if frequency hopping is enabled, using a first subband for transmitting a first SRS transmission of the one or more SRS transmissions of the first type in the at least one uplink subframe and switching to using a second subband for transmitting a second SRS transmission of the one or more SRS transmissions of the first type in the at least one uplink subframe.

14. The method of claim 13, wherein the first configuration includes:
an indication of a SRS frequency hopping pattern configuration for the intra-subframe SRS frequency hopping; and
an indication of whether a guard symbol is to be inserted between switching SRS subbands.

15. The method of claim 13, wherein:
the intra-subframe SRS frequency hopping includes a full set of subband switching or a subset of subband switching within SRS symbols configured for transmitting the one or more SRS transmissions of the first type; and
a number of frequency hops for the one or more SRS transmissions of the first type is dependent on at least a configured duration of symbols for the one or more SRS transmissions of the first type and a guard symbol, if configured.

16. The method of claim 13, wherein the first configuration includes an indication of a hopping bandwidth to perform frequency hopping during transmission of the one or more SRS transmissions of the first type in the at least one uplink subframe.

17. The method of claim 16, wherein the hopping bandwidth is indicated as a total SRS bandwidth divided by a configured number of SRS transmissions of the first type in the at least one uplink subframe.

18. The method of claim 16, wherein the first configuration includes a starting frequency location in the hopping bandwidth to perform the frequency hopping during transmission of the one or more SRS transmissions of the first type in the at least one uplink subframe.

19. The method of claim 18, wherein the starting frequency location comprises at least one of a subband index or a physical resource block.

20. A method of wireless communications by a user equipment (UE) in a network, comprising:
receiving, from the network, signaling indicating, for a set of uplink subframes, a first configuration for transmitting one or more SRS transmissions of a first type and a second configuration for transmitting one or more SRS transmission of a second type;
transmitting, within at least one uplink subframe of the set of uplink subframes, at least one of the one or more SRS transmissions of the first type or the one or more SRS transmissions of the second type based, at least in part, on at least one of the first configuration or the second configuration; and
receiving a trigger indication indicating that the one or more SRS transmissions of the first type and the one or more SRS transmissions of the second type are allowed to be transmitted in a same uplink subframe, wherein the at least one uplink subframe comprises the same uplink subframe.

21. The method of claim 20, wherein the trigger indication indicates that the one or more SRS transmissions of the first type and the one or more SRS transmissions of the second type are not allowed to be transmitted in the same uplink subframe; and
transmitting at least one of the one or more SRS transmissions of the first type or the one or more SRS transmissions of the second type comprises:
selecting one of the one or more SRS transmissions of the first type or the one or more SRS transmissions of the second type to transmit based on a priority order; and
transmitting the selected one or more SRS transmissions of the first type or the one or more SRS transmissions of the second type.

22. The method of claim 20, wherein:
transmitting comprises transmitting the one or more SRS transmissions of the first type and the one or more SRS transmissions of the second type in the same uplink subframe based, at least in part, on the trigger indication;
transmitting the one or more SRS transmissions of the first type comprises transmitting the one or more SRS transmission of the first type according to the first configuration;
transmitting the one or more SRS transmissions of the second type comprises transmitting the one or more SRS transmission of the second type according to the second configuration; and
the trigger indication is received in one or more of downlink control information or a radio resource control message.

23. A method of wireless communications by a user equipment (UE) in a network, comprising:
receiving, from the network, signaling indicating, for a set of uplink subframes, a first configuration for transmitting one or more SRS transmissions of a first type and a second configuration for transmitting one or more SRS transmission of a second type, wherein the first configuration includes a first indication of a transmission power for transmitting the one or more SRS transmissions of the first type and the second configuration includes a second indication of a transmission power for transmitting the one or more SRS transmissions of the second type;

determining a power change between the transmission power for transmitting the one or more SRS transmissions of the first type and the transmission power for transmitting the one or more SRS transmissions of the second type is not supported by the UE; and transmitting, within at least one uplink subframe of the set of uplink subframes, at least one of the one or more SRS transmissions of the first type or the one or more SRS transmissions of the second type based on:

at least one of the first configuration or the second configuration, and a priority order in response to the determination that the power change is not supported by the UE.

24. The method of claim 1, wherein the first configuration comprises information indicating resources for transmitting SRSs on a per-component-carrier basis or a per-component-carrier-group basis.

25. A method of wireless communications by a user equipment (UE) in a network, comprising:

receiving, from the network, signaling indicating, for a set of uplink subframes, a first configuration for transmitting one or more SRS transmissions of a first type and a second configuration for transmitting one or more SRS transmission of a second type;

transmitting, within at least one uplink subframe of the set of uplink subframes, at least one of the one or more SRS transmissions of the first type or the one or more SRS transmissions of the second type based, at least in part, on at least one of the first configuration or the second configuration; and determining a latency between the one or more SRS transmissions of the first type and its trigger indication is not less than that a minimum value, wherein the transmitting is based further on the determination.

26. A method of wireless communications by a base station in a network, comprising:

transmitting, to a user equipment (UE), signaling indicating, for a set of uplink subframes, a first configuration for transmitting one or more SRS transmissions of a first type and a second configuration for transmitting one or more SRS transmission of a second type, wherein the first configuration indicates an SRS repetition pattern for the one or more SRS transmissions of the first type; and receiving, within at least one uplink subframe of the set of uplink subframes, at least one of the one or more SRS transmissions of the first type or the one or more SRS transmissions of the second type based, at least in part, on at least one of the first configuration or the second configuration, wherein receiving, within the at least one uplink subframe of the set of uplink subframes, comprises receiving the one or more SRS transmissions of the first type further based on the SRS repetition pattern.

27. The method of claim 26, wherein:

a resource configuration for the one or more SRS transmissions of the first type is different from that of the one or more SRS transmissions of the second type in the at least one uplink subframe; and further comprising triggering the one or more SRS transmissions of the first type in a same or a different way from that of the one or more SRS transmissions of the second type.

28. The method of claim 26, wherein:

the one or more SRS transmissions of the first type comprise non-legacy SRS transmissions not located in the last symbol of the at least one uplink subframe;

the non-legacy SRS transmissions comprise at least one of one of periodic SRS transmissions or aperiodic SRS transmissions;

the one or more SRS transmissions of the second type comprise legacy SRS transmissions located in at least one of the last symbol of the at least one uplink subframe; and the legacy SRS transmissions comprise at least one of periodic SRS transmissions or aperiodic SRS transmissions.

29. The method of claim 26, wherein the first configuration indicates a periodicity and subframe offset for transmitting the one or more SRS transmissions of the first type, wherein the periodicity and subframe offset for transmitting the one or more SRS transmissions of the first type is the same or different from a periodicity and subframe offset for the one or more SRS transmissions of the second type.

30. The method of claim 26, wherein:

the first configuration indicates a first uplink subframe for transmission of the one or more SRS transmissions of the first type that does not overlap with a second uplink subframe, indicated in the second configuration, for transmission of the one or more SRS transmissions of the second type; and receiving, within the at least one uplink subframe of the set of uplink subframes, includes receiving at least one SRS transmission of the one or more SRS transmissions of the first type in a last symbol of the at least one uplink subframe.

31. The method of claim 26, wherein the first configuration indicates at least one of:

a list of symbol indices, a starting symbol, a symbol duration, and a guard symbol, if configured, for transmitting the one or more SRS transmissions of the first type; or symbol bitmap indicating the symbols in the at least one uplink subframe for transmitting the one or more SRS transmissions of the first type.

32. The method of claim 26, wherein the first configuration indicates a slot index of the at least one uplink subframe for transmitting the one or more SRS transmissions of the first type.

33. The method of claim 26, wherein the SRS repetition pattern indicates a first SRS transmission of the one or more SRS transmissions of the first type is to be repeated in a number of symbols in the at least one uplink subframe using a same antenna transmission port, antenna, and subband before switching the antenna or the subband.

34. A method of wireless communications by a base station in a network, comprising:

transmitting, to a user equipment (UE), signaling indicating, for a set of uplink subframes, a first configuration for transmitting one or more SRS transmissions of a first type and a second configuration for transmitting one or more SRS transmission of a second type, wherein the first configuration includes an indication of whether intra-subframe SRS antenna switching is enabled or disabled for at least one uplink subframe;

receiving, within the at least one uplink subframe of the set of uplink subframes, at least one of the one or more SRS transmissions of the first type or the one or more SRS transmissions of the second type based, at least in part, on at least one of the first configuration or the second configuration; and if antenna switching is enabled, receiving a first SRS transmission of the one or more SRS transmissions of the first type in the at least one uplink subframe to obtain channel information of a first antenna or a first antenna group at the UE and receiving a second SRS transmission of the one or more SRS transmissions of the first type in the at least one uplink subframe to obtain channel information of a second antenna or a second antenna group.

35. The method of claim 34, wherein the first configuration includes:
    an indication of an SRS antenna switching pattern configuration for the intra-subframe SRS antenna switching; and
    an indication of whether a guard symbol is to be inserted between switching antennas or antenna groups.

36. The method of claim 34, wherein the intra-subframe SRS antenna switching includes a full set of antenna or antenna group switching within SRS symbols configured for transmitting the one or more SRS transmissions of the first type.

37. The method of claim 34, wherein the first configuration includes a starting antenna index or a starting antenna group index to perform antenna switching during transmission of the one or more SRS transmissions of the first type in the at least one uplink subframe, and wherein the starting antenna index or the starting antenna group index is zero.

38. A method of wireless communications by a base station in a network, comprising:
    transmitting, to a user equipment (UE), signaling indicating, for a set of uplink subframes, a first configuration for transmitting one or more SRS transmissions of a first type and a second configuration for transmitting one or more SRS transmission of a second type, wherein the first configuration includes an indication of whether intra-subframe SRS frequency hopping is enabled or disabled for at least one uplink subframe;
    receiving, within the at least one uplink subframe of the set of uplink subframes, at least one of the one or more SRS transmissions of the first type or the one or more SRS transmissions of the second type based, at least in part, on at least one of the first configuration or the second configuration
    if frequency hopping is enabled, receiving a first SRS transmission of the one or more SRS transmissions of the first type in the at least one uplink subframe to obtain channel information on a first subband and receiving a second SRS transmission of the one or more SRS transmissions of the first type in the at least one uplink subframe to obtain channel information on a second subband.

39. The method of claim 38, wherein the first configuration includes:
    an indication of a SRS frequency hopping pattern configuration for the intra-subframe SRS frequency hopping; and
    an indication of whether a guard symbol is to be inserted between switching SRS subbands.

40. The method of claim 38, where:
    the intra-subframe SRS frequency hopping includes a full set of subband switching or a subset of subband switching within SRS symbols configured for transmitting the one or more SRS transmissions of the first type; and
    a number of frequency hops for the one or more SRS transmissions of the first type is dependent on at least a configured duration of symbols for the one or more SRS transmissions of the first type and a guard symbol, if configured.

41. The method of claim 38, wherein the first configuration includes an indication of a hopping bandwidth to perform frequency hopping during transmission of the one or more SRS transmissions of the first type in the at least one uplink subframe.

42. The method of claim 41, wherein the hopping bandwidth is indicated as a total SRS bandwidth divided by a configured number of SRS transmissions of the first type in the at least one uplink subframe.

43. The method of claim 41, wherein the first configuration includes a starting frequency location in the hopping bandwidth to perform the frequency hopping during transmission of the one or more SRS transmissions of the first type in the at least one uplink subframe.

44. The method of claim 43, wherein the starting frequency location comprises at least one of a subband index or a physical resource block.

45. A method of wireless communications by a base station in a network, comprising:
    transmitting, to a user equipment (UE), signaling indicating, for a set of uplink subframes, a first configuration for transmitting one or more SRS transmissions of a first type and a second configuration for transmitting one or more SRS transmission of a second type; and
    receiving, within at least one uplink subframe of the set of uplink subframes, at least one of the one or more SRS transmissions of the first type or the one or more SRS transmissions of the second type based, at least in part, on at least one of the first configuration or the second configuration; and
    transmitting a trigger indication of whether the one or more SRS transmissions of the first type and the one or more SRS transmissions of the second type are allowed to be transmitted in a same uplink subframe, wherein the at least one uplink subframe comprises the same uplink subframe.

46. The method of claim 45, wherein the trigger indication indicates that the one or more SRS transmissions of the first type and the one or more SRS transmissions of the second type are not allowed to be transmitted in the same uplink subframe; and
    receiving at least one of the one or more SRS transmissions of the first type or the one or more SRS transmissions of the second type comprises:
    receiving one of the one or more SRS transmissions of the first type or the one or more SRS transmissions of the second type in the same uplink subframe based on a priority order.

47. The method of claim 45, wherein:
    receiving comprises receiving the one or more SRS transmissions of the first type and the one or more SRS transmissions of the second type in the same uplink subframe based, at least in part, on the trigger indication;
    receiving the one or more SRS transmissions of the first type comprises receiving the one or more SRS transmission of the first type according to the first configuration;
    receiving the one or more SRS transmissions of the second type comprises receiving the one or more SRS transmission of the second type according to the second configuration; and
    the trigger indication is transmitted in one or more of downlink control information or a radio resource control message.

48. A method of wireless communications by a base station in a network, comprising:
    transmitting, to a user equipment (UE), signaling indicating, for a set of uplink subframes, a first configuration for transmitting one or more SRS transmissions of a first type and a second configuration for transmitting one or more SRS transmission of a second type, wherein:
the first configuration includes a first indication of a transmission power for transmitting the one or more SRS transmissions of the first type and the second configuration includes a second indication of a transmission power for transmitting the one or more SRS transmissions of the second type, and
a power change between the transmission power for transmitting the one or more SRS transmissions of the first type and the transmission power for transmitting the one or more SRS transmissions of the second type is not supported by the UE; and
receiving, within at least one uplink subframe of the set of uplink subframes, at least one of the one or more SRS transmissions of the first type or the one or more SRS transmissions of the second type based on:
at least one of the first configuration or the second configuration, and
a priority order in response to the determination that the power change is not supported by the UE.

49. The method of claim 26, wherein the first configuration comprises information indicating resources for transmitting SRSs on a per-component-carrier basis or a per-component-carrier-group basis.

50. An apparatus for wireless communications by a user equipment (UE) in a network, comprising:
at least one processor configured to:
receive, from the network, signaling indicating, for a set of uplink subframes, a first configuration for transmitting one or more SRS transmissions of a first type and a second configuration for transmitting one or more SRS transmission of a second type, wherein the first configuration indicates an SRS repetition pattern for the one or more SRS transmissions of the first type; and
transmit, within at least one uplink subframe of the set of uplink subframes, at least one of the one or more SRS transmissions of the first type or the one or more SRS transmissions of the second type based, at least in part, on at least one of the first configuration or the second configuration, wherein, in order to transmit, within the at least one uplink subframe of the set of uplink subframes, the at least one processor is further configured to transmit the one or more SRS transmissions of the first type further based on the SRS repetition pattern; and
a memory coupled with the at least one processor.

51. An apparatus for wireless communications by a base station (BS) in a network, comprising:
at least one processor configured to:
transmit, to a user equipment (UE), signaling indicating, for a set of uplink subframes, a first configuration for transmitting one or more SRS transmissions of a first type and a second configuration for transmitting one or more SRS transmission of a second type, wherein the first configuration indicates an SRS repetition pattern for the one or more SRS transmissions of the first type; and
receive, within at least one uplink subframe of the set of uplink subframes, at least one of the one or more SRS transmissions of the first type or the one or more SRS transmissions of the second type based, at least in part, on at least one of the first configuration or the second configuration, wherein, in order to receive, within the at least one uplink subframe of the set of uplink subframes, the at least one processor is further configured to receive the one or more SRS transmissions of the first type further based on the SRS repetition pattern; and
a memory coupled with the at least one processor.

* * * * *